(12) United States Patent
Lantz et al.

(10) Patent No.: US 12,293,324 B2
(45) Date of Patent: May 6, 2025

(54) PLACEMENT OF TRACKING DEVICES ON PALLETS

(71) Applicant: BXB Digital Pty Limited, Sydney (AU)

(72) Inventors: Daniel J. Lantz, Orlando, FL (US); Sandeep K. Bandil, Los Altos, CA (US); Ryan Daigle, Fremont, CA (US); Jun Shi, Palo Alto, CA (US)

(73) Assignee: BXB Digital Pty Limited, Sydney (AU)

( * ) Notice: Subject to any disclaimer, the term of this patent is extended or adjusted under 35 U.S.C. 154(b) by 0 days.

(21) Appl. No.: 18/409,476

(22) Filed: Jan. 10, 2024

(65) Prior Publication Data

US 2024/0144162 A1 May 2, 2024

Related U.S. Application Data

(62) Division of application No. 17/135,616, filed on Dec. 28, 2020, now Pat. No. 11,900,307, which is a
(Continued)

(51) Int. Cl.
*G06Q 10/0833* (2023.01)
*B65D 19/00* (2006.01)
(Continued)

(52) U.S. Cl.
CPC ..... *G06Q 10/0833* (2013.01); *B65D 19/0004* (2013.01); *B65D 19/0095* (2013.01);
(Continued)

(58) Field of Classification Search
CPC ............. G06Q 10/0833; G06Q 10/087; B65D 19/0004; B65D 19/0095; B65D 19/44;
(Continued)

(56) References Cited

U.S. PATENT DOCUMENTS

| 681,428 A | 8/1901 | Ambrose |
| 5,438,607 A | 8/1995 | Przygoda, Jr. et al. |

(Continued)

FOREIGN PATENT DOCUMENTS

| CA | 2185354 A1 | 9/1995 |
| CN | 101809601 B | 3/2015 |

(Continued)

OTHER PUBLICATIONS

G. Yang, Hybrid Cargo-Level Tracking System for Logistics, 2010, pp. 1-5 (Year: 2010).*
(Continued)

*Primary Examiner* — Ibrahim N El-Bathy
(74) *Attorney, Agent, or Firm* — Perilla Knox & Hildebrandt LLP; Kenneth A. Knox

(57) ABSTRACT

Various approaches for attaching tracking devices to pallets allow pallets to be remotely tracked through any phase of a transportation lifecycle. In a first approach, one or more electronic components of a tracking device may be disposed within a cavity of a block of a pallet. In a second approach, one or more electronic components of a tracking device may be disposed within a strut that interfaces between two beams of a pallet. In a third approach, one or more electronic components of a tracking device may be disposed within a cavity of a beam.

10 Claims, 16 Drawing Sheets

Related U.S. Application Data division of application No. 15/972,835, filed on May 7, 2018, now Pat. No. 10,878,366.

(60) Provisional application No. 62/502,280, filed on May 5, 2017.

(51) Int. Cl.
 *B65D 19/38* (2006.01)
 *B65D 19/44* (2006.01)
 *G06Q 10/087* (2023.01)

(52) U.S. Cl.
 CPC ............. *B65D 19/38* (2013.01); *B65D 19/44* (2013.01); *G06Q 10/087* (2013.01); *B65D 2203/10* (2013.01); *B65D 2519/00024* (2013.01); *B65D 2519/00029* (2013.01); *B65D 2519/00034* (2013.01); *B65D 2519/00064* (2013.01); *B65D 2519/00069* (2013.01); *B65D 2519/00099* (2013.01); *B65D 2519/00104* (2013.01); *B65D 2519/00273* (2013.01); *B65D 2519/00293* (2013.01); *B65D 2519/00323* (2013.01); *B65D 2519/00333* (2013.01); *B65D 2519/00373* (2013.01); *B65D 2519/00562* (2013.01); *B65D 2519/00572* (2013.01); *B65D 2519/00796* (2013.01); *B65D 2519/0081* (2013.01)

(58) Field of Classification Search
 CPC ...... B65D 2203/10; B65D 2519/00024; B65D 2519/00029; B65D 2519/00034; B65D 2519/00064; B65D 2519/00069; B65D 2519/00099; B65D 2519/00104; B65D 2519/00273; B65D 2519/00293; B65D 2519/00323; B65D 2519/00333; B65D 2519/00373; B65D 2519/00562; B65D 2519/00572; B65D 2519/00796
 See application file for complete search history.

(56) References Cited

U.S. PATENT DOCUMENTS

| | | |
|---|---|---|
| 5,491,486 A | 2/1996 | Welles, II et al. |
| 5,691,980 A | 11/1997 | Welles, II et al. |
| 5,774,876 A | 6/1998 | Woolley et al. |
| 5,844,482 A | 12/1998 | Guthrie et al. |
| 6,199,488 B1 | 3/2001 | Favaron et al. |
| 6,294,114 B1 | 9/2001 | Muirhead |
| 6,373,389 B1 | 4/2002 | Przygoda, Jr. et al. |
| 6,415,223 B1 | 7/2002 | Lin et al. |
| 6,483,434 B1 | 11/2002 | UmiKer |
| 6,600,418 B2 | 7/2003 | Francis et al. |
| 6,661,339 B2 | 12/2003 | Muirhead |
| 6,667,936 B1 | 12/2003 | Ditzig |
| 6,669,089 B2 | 12/2003 | Cybulski et al. |
| 6,700,533 B1 | 3/2004 | Werb et al. |
| 6,707,381 B1 | 3/2004 | Maloney |
| 6,717,517 B2 | 4/2004 | Przygoda, Jr. |
| 6,718,888 B2 | 4/2004 | Muirhead |
| 6,749,418 B2 | 6/2004 | Muirhead |
| 6,814,287 B1 | 11/2004 | Chang et al. |
| 6,900,815 B2 | 5/2005 | Yoshioka |
| 6,934,625 B2 | 8/2005 | Haddad |
| 6,943,678 B2 | 9/2005 | Muirhead |
| 7,026,937 B2 | 4/2006 | Przygoda, Jr. |
| 7,034,683 B2 | 4/2006 | Ghazarian |
| 7,100,052 B2 | 8/2006 | Ghazarian |
| 7,133,704 B2 | 11/2006 | Twitchell, Jr. |
| 7,155,264 B2 | 12/2006 | Twitchell, Jr. |
| 7,173,529 B2 | 2/2007 | Przygoda, Jr. |
| 7,209,771 B2 | 4/2007 | Twitchell, Jr. |
| 7,242,306 B2 | 7/2007 | Wildman et al. |
| 7,252,230 B1 | 8/2007 | Sheikh et al. |
| 7,313,476 B2 | 12/2007 | Nichols et al. |
| 7,336,152 B2 | 2/2008 | Horwitz et al. |
| 7,336,167 B2 | 2/2008 | Olsen, III et al. |
| 7,336,182 B1 | 2/2008 | Baranowski et al. |
| 7,342,496 B2 | 3/2008 | Muirhead |
| 7,365,737 B2 | 4/2008 | Marvit et al. |
| 7,388,492 B2 | 6/2008 | Watanabe |
| 7,398,153 B2 | 7/2008 | Workman et al. |
| 7,400,259 B2 | 7/2008 | O'Connor et al. |
| 7,443,297 B1 | 10/2008 | Baranowski et al. |
| 7,446,658 B2 | 11/2008 | Panotopoulos |
| 7,564,357 B2 | 7/2009 | Baranowski et al. |
| 7,633,389 B2 | 12/2009 | Mantovani et al. |
| 7,656,278 B2 | 2/2010 | Onishi et al. |
| 7,668,596 B2 | 2/2010 | Von Arx et al. |
| 7,735,430 B2 | 6/2010 | Muirhead |
| 7,742,745 B2 | 6/2010 | Twitchell, Jr. |
| 7,752,980 B2 | 7/2010 | Muirhead |
| 7,783,423 B2 | 8/2010 | Verma et al. |
| 7,789,024 B2 | 9/2010 | Muirhead |
| 7,804,400 B2 | 9/2010 | Muirhead |
| 7,874,256 B2 | 1/2011 | Muirhead |
| 7,903,084 B2 | 3/2011 | Marvit et al. |
| 7,948,371 B2 | 5/2011 | Muirhead |
| 7,956,746 B2 | 6/2011 | Truscott et al. |
| 7,963,235 B2 | 6/2011 | Muirhead |
| 7,999,670 B2 | 8/2011 | McClellan et al. |
| 8,036,826 B2 | 10/2011 | MacIntosh et al. |
| 8,041,079 B2 | 10/2011 | Chiu et al. |
| 8,077,040 B2 | 12/2011 | Muirhead |
| 8,095,070 B2 | 1/2012 | Twitchell, Jr. |
| RE43,178 E | 2/2012 | Ghazarian |
| 8,111,157 B2 | 2/2012 | Diener et al. |
| 8,159,338 B2 | 4/2012 | Breed |
| 8,184,852 B2 | 5/2012 | Hofman et al. |
| 8,204,439 B2 | 6/2012 | Twitchell, Jr. |
| 8,210,107 B2 | 7/2012 | Muirhead |
| 8,219,558 B1 | 7/2012 | Trandal et al. |
| 8,229,473 B1 | 7/2012 | De La Rue |
| 8,248,242 B2 | 8/2012 | Caliri et al. |
| 8,269,605 B2 | 9/2012 | Moore |
| 8,313,594 B2 | 11/2012 | Muirhead |
| 8,331,862 B2 | 12/2012 | Twitchell, Jr. |
| 8,347,794 B2 | 1/2013 | Muirhead |
| 8,511,555 B2 | 8/2013 | Babcock et al. |
| 8,514,058 B2 | 8/2013 | Cameron |
| 8,585,850 B2 | 11/2013 | Muirhead |
| 8,594,923 B2 | 11/2013 | Wong et al. |
| 8,630,768 B2 | 1/2014 | McClellan et al. |
| 8,692,764 B2 | 4/2014 | Marvit et al. |
| 8,694,251 B2 | 4/2014 | Janardhanan et al. |
| 8,718,372 B2 | 5/2014 | Holeva et al. |
| 8,830,072 B2 | 9/2014 | Batra et al. |
| 8,849,007 B2 | 9/2014 | Holeva et al. |
| 8,977,032 B2 | 3/2015 | Holeva et al. |
| 9,025,827 B2 | 5/2015 | Holeva et al. |
| 9,025,886 B2 | 5/2015 | Holeva et al. |
| 9,082,195 B2 | 7/2015 | Holeva et al. |
| 9,087,384 B2 | 7/2015 | Holeva et al. |
| 9,230,227 B2 | 1/2016 | Muirhead |
| 9,466,198 B2 | 10/2016 | Burch et al. |
| 9,488,986 B1 | 11/2016 | Solanki |
| 9,504,414 B2 | 11/2016 | Coza et al. |
| 9,613,239 B2 | 4/2017 | Lee et al. |
| 9,635,346 B2 | 4/2017 | Iida |
| 9,656,485 B2 | 5/2017 | Asai et al. |
| 9,679,237 B2 | 6/2017 | Linkesch et al. |
| 9,813,850 B2 | 11/2017 | Lee et al. |
| 9,868,212 B1 | 1/2018 | Hinterstoisser |
| 9,947,196 B2 | 4/2018 | Lee et al. |
| 9,965,662 B2 | 5/2018 | Lee et al. |
| 10,102,629 B1 | 10/2018 | Li |
| 10,242,273 B1 | 3/2019 | Eckman |
| 10,328,578 B2 | 6/2019 | Holz |
| 10,339,619 B2 | 7/2019 | Muirhead |
| 10,346,797 B2 | 7/2019 | Jacobus et al. |
| 10,347,005 B2 | 7/2019 | Iida et al. |
| 10,368,222 B2 | 7/2019 | Carlson et al. |

(56) References Cited

U.S. PATENT DOCUMENTS

| | | | |
|---|---|---|---|
| 10,491,375 B2 | 11/2019 | Maggu et al. | |
| 10,549,885 B2 | 2/2020 | De Bokx et al. | |
| 10,614,319 B2 | 4/2020 | Douglas et al. | |
| 10,816,637 B2 | 10/2020 | Connors et al. | |
| 10,824,904 B2 | 11/2020 | Souder et al. | |
| 10,825,120 B2 | 11/2020 | Daigle et al. | |
| 10,832,208 B2 | 11/2020 | Souder et al. | |
| 10,867,301 B2 | 12/2020 | Withrow et al. | |
| 10,878,366 B2 | 12/2020 | Lantz et al. | |
| 11,066,210 B1 | 7/2021 | Ankele et al. | |
| 11,900,307 B2 | 2/2024 | Lantz et al. | |
| 2002/0047850 A1 | 4/2002 | Yoshioka | |
| 2002/0070862 A1 | 6/2002 | Francis et al. | |
| 2003/0083964 A1 | 5/2003 | Horwitz et al. | |
| 2003/0089771 A1 | 5/2003 | Cybulski et al. | |
| 2003/0137968 A1 | 7/2003 | Lareau et al. | |
| 2003/0170357 A1 | 9/2003 | Garwood | |
| 2004/0015264 A1 | 1/2004 | Holland et al. | |
| 2004/0103031 A1 | 5/2004 | Weinschenk | |
| 2004/0113786 A1 | 6/2004 | Maloney | |
| 2004/0233041 A1 | 11/2004 | Bohman et al. | |
| 2005/0046567 A1 | 3/2005 | Mortenson et al. | |
| 2005/0063590 A1 | 3/2005 | Simon et al. | |
| 2005/0226489 A1 | 10/2005 | Beach et al. | |
| 2005/0231366 A1 | 10/2005 | McHugh et al. | |
| 2005/0247775 A1 | 11/2005 | Gloekler et al. | |
| 2006/0232412 A1 | 10/2006 | Tabacman et al. | |
| 2006/0254474 A1* | 11/2006 | Roth | B65D 19/0095 108/51.11 |
| 2006/0261959 A1 | 11/2006 | Worthy et al. | |
| 2007/0091292 A1 | 4/2007 | Cho et al. | |
| 2007/0095905 A1 | 5/2007 | Kadaba | |
| 2007/0108296 A1 | 5/2007 | Konopka et al. | |
| 2007/0115859 A1 | 5/2007 | Meyers | |
| 2007/0282482 A1 | 12/2007 | Beucher et al. | |
| 2008/0052205 A1 | 2/2008 | Dolley et al. | |
| 2008/0106468 A1 | 5/2008 | Litva et al. | |
| 2008/0114487 A1 | 5/2008 | Schuler et al. | |
| 2008/0143484 A1 | 6/2008 | Twitchell | |
| 2008/0198001 A1 | 8/2008 | Sarma et al. | |
| 2009/0101712 A1 | 4/2009 | Ulrich et al. | |
| 2010/0006377 A1 | 1/2010 | McCabe | |
| 2010/0299278 A1 | 11/2010 | Kriss et al. | |
| 2010/0310182 A1 | 12/2010 | Kroepfl et al. | |
| 2010/0332407 A1 | 12/2010 | Grieve et al. | |
| 2011/0040440 A1 | 2/2011 | de Oliveira et al. | |
| 2011/0054979 A1 | 3/2011 | Cova et al. | |
| 2011/0095871 A1 | 4/2011 | Kail et al. | |
| 2011/0169636 A1 | 7/2011 | Kadaba | |
| 2011/0227725 A1 | 9/2011 | Muirhead | |
| 2011/0251920 A1 | 10/2011 | Watson | |
| 2011/0260869 A1 | 10/2011 | Gagnon et al. | |
| 2011/0265695 A1 | 11/2011 | Moore et al. | |
| 2011/0266338 A1 | 11/2011 | Babcock et al. | |
| 2012/0066511 A1 | 3/2012 | Scheidt et al. | |
| 2012/0105202 A1 | 5/2012 | Gits et al. | |
| 2012/0126000 A1 | 5/2012 | Kunzig et al. | |
| 2012/0166241 A1 | 6/2012 | Livingston et al. | |
| 2012/0232430 A1 | 9/2012 | Boissy et al. | |
| 2012/0239499 A1 | 9/2012 | Zughaib et al. | |
| 2012/0252501 A1 | 10/2012 | Smith et al. | |
| 2012/0323431 A1 | 12/2012 | Wong et al. | |
| 2013/0022238 A1 | 1/2013 | Wood et al. | |
| 2013/0041290 A1 | 2/2013 | Kording et al. | |
| 2013/0041617 A1 | 2/2013 | Pease et al. | |
| 2013/0045760 A1 | 2/2013 | Obermeyer et al. | |
| 2013/0101230 A1 | 4/2013 | Holeva et al. | |
| 2013/0324151 A1 | 12/2013 | Lee | |
| 2014/0016821 A1 | 1/2014 | Arth et al. | |
| 2014/0049392 A1 | 2/2014 | Wagner | |
| 2014/0062774 A1 | 3/2014 | Hale et al. | |
| 2014/0120945 A1 | 5/2014 | Sharma et al. | |
| 2014/0193077 A1 | 7/2014 | Shiiyama et al. | |
| 2014/0222711 A1 | 8/2014 | Tibbs et al. | |
| 2014/0289020 A1 | 9/2014 | Schullian et al. | |
| 2014/0297485 A1 | 10/2014 | Steely et al. | |
| 2014/0304123 A1 | 10/2014 | Schwartz | |
| 2015/0039529 A1 | 2/2015 | Barakat | |
| 2015/0062160 A1 | 3/2015 | Sakamoto et al. | |
| 2015/0120597 A1 | 4/2015 | Dertadian | |
| 2015/0127496 A1 | 5/2015 | Marathe et al. | |
| 2015/0134403 A1 | 5/2015 | Schwartz | |
| 2015/0146989 A1 | 5/2015 | Shiiyama et al. | |
| 2015/0379510 A1 | 12/2015 | Smith | |
| 2016/0021636 A1 | 1/2016 | Krallman et al. | |
| 2016/0063550 A1 | 3/2016 | Caldwell | |
| 2016/0189000 A1 | 6/2016 | Dube et al. | |
| 2016/0198341 A1 | 7/2016 | Fransen | |
| 2016/0198431 A1 | 7/2016 | Pattabiraman et al. | |
| 2016/0205500 A1 | 7/2016 | Lee | |
| 2016/0205654 A1 | 7/2016 | Robinson, Jr. | |
| 2016/0239706 A1 | 8/2016 | Dijkman et al. | |
| 2016/0259339 A1 | 9/2016 | High et al. | |
| 2016/0260059 A1 | 9/2016 | Benjamin et al. | |
| 2016/0260301 A1 | 9/2016 | Miller et al. | |
| 2016/0321729 A1 | 11/2016 | Westphal | |
| 2017/0015111 A1 | 1/2017 | Asai et al. | |
| 2017/0019264 A1 | 1/2017 | Nugent et al. | |
| 2017/0019754 A1 | 1/2017 | Wilkinson | |
| 2017/0140408 A1 | 5/2017 | Wuehler | |
| 2017/0193438 A1 | 7/2017 | Jones et al. | |
| 2017/0243103 A1* | 8/2017 | Linkesch | G06K 19/07722 |
| 2017/0323412 A1 | 11/2017 | Muirhead | |
| 2017/0366357 A1 | 12/2017 | Pattanaik et al. | |
| 2017/0372103 A1 | 12/2017 | Lee et al. | |
| 2018/0009234 A1 | 1/2018 | Ohi et al. | |
| 2018/0018627 A1 | 1/2018 | Ross et al. | |
| 2018/0038805 A1 | 2/2018 | Heikkila et al. | |
| 2018/0039524 A1 | 2/2018 | Dettori et al. | |
| 2018/0082390 A1 | 3/2018 | Leidner et al. | |
| 2018/0089638 A1 | 3/2018 | Christidis et al. | |
| 2018/0143995 A1 | 5/2018 | Bailey et al. | |
| 2018/0196680 A1 | 7/2018 | Wang et al. | |
| 2018/0217250 A1 | 8/2018 | Cristache | |
| 2018/0227570 A1 | 8/2018 | Page et al. | |
| 2018/0232693 A1 | 8/2018 | Gillen et al. | |
| 2018/0268348 A1 | 9/2018 | Guan | |
| 2018/0293645 A1 | 10/2018 | Pannicke et al. | |
| 2018/0304468 A1 | 10/2018 | Holz | |
| 2018/0322453 A1 | 11/2018 | Lantz et al. | |
| 2018/0342032 A1 | 11/2018 | Daigle et al. | |
| 2019/0012637 A1 | 1/2019 | Gillen | |
| 2019/0019144 A1 | 1/2019 | Gillen | |
| 2019/0057231 A1 | 2/2019 | Bandil et al. | |
| 2019/0080392 A1 | 3/2019 | Youb et al. | |
| 2019/0098432 A1 | 3/2019 | Carlson et al. | |
| 2019/0109702 A1 | 4/2019 | Maggu et al. | |
| 2019/0130345 A1 | 5/2019 | Antor et al. | |
| 2019/0168912 A1* | 6/2019 | de Bokx | B65D 19/44 |
| 2019/0190719 A1 | 6/2019 | van de Ruit et al. | |
| 2019/0251385 A1 | 8/2019 | Kotula | |
| 2019/0259062 A1 | 8/2019 | Caldwell | |
| 2019/0340623 A1 | 11/2019 | Rivkind et al. | |
| 2019/0370816 A1 | 12/2019 | Hu | |
| 2020/0019927 A1 | 1/2020 | Muirhead | |
| 2020/0118117 A1 | 4/2020 | McManus et al. | |
| 2020/0184291 A1 | 6/2020 | Tisdel | |
| 2020/0209343 A1 | 7/2020 | Connors et al. | |
| 2020/0272986 A1 | 8/2020 | Bandil et al. | |

FOREIGN PATENT DOCUMENTS

| | | | | |
|---|---|---|---|---|
| CN | 106471526 A | | 3/2017 | |
| DE | 9306107 U1 | | 8/1994 | |
| DE | 102006009802 A1 | | 4/2007 | |
| DE | 202012008230 U1 | | 10/2012 | |
| EP | 1246094 A1 | | 10/2002 | |
| EP | 2593372 A2 | | 5/2013 | |
| EP | 3128471 A1 | | 2/2017 | |
| EP | 2593372 B1 | * | 2/2018 | B29C 44/0407 |
| EP | 3323756 A1 | | 5/2018 | |
| JP | 2006243873 A | | 9/2006 | |
| JP | 2017019586 A | | 1/2017 | |
| WO | 9616387 A1 | | 5/1996 | |

(56) References Cited

FOREIGN PATENT DOCUMENTS

| | | | |
|---|---|---|---|
| WO | 2008038017 A1 | 4/2008 | |
| WO | 2010114478 A1 | 10/2010 | |
| WO | 2017165909 A1 | 10/2017 | |
| WO | 2019010480 A1 | 1/2019 | |

OTHER PUBLICATIONS

"Geo-Fence", Wikipedia, Available Online at: https://en.wikipedia.Org/w/index.php?title=Geofence&oldid=768541623, Mar. 4, 2017, 3 pages.

"Go To Pallets Marketing Brochure", Available Online at: http://gotopallets.com, Oct. 12, 2016, 8 pages.

"Intermec's Intellitag RFID Technology Enables CHEP's", Global Pallet Tracking Business Wire, Nov. 13, 2001, 4 pages.

"Recommendations on the Grocery Industry Pallet System", Written for the The Grocery Industry Pallet Subcommittee by Cleveland Consulting Associates, Jan. 1, 1992, 16 pages.

"The Future of the Pallet Pooling Industry Begins With the G2 Pallet", GoTo Pallets Inc., Available Online At: http://gotopallets.com, Oct. 1, 2016, 77 pages.

U.S. Appl. No. 15/972,835 , Non-Final Office Action, Mailed on Feb. 13, 2020, 16 pages.

U.S. Appl. No. 15/972,835 , "Notice of Allowability", filed Oct. 29, 2020, 11 pages.

U.S. Appl. No. 15/972,835 , Notice of Allowance, Mailed on Jun. 4, 2020, 13 pages.

U.S. Appl. No. 15/972,835 , Notice of Allowance, Mailed on Oct. 7, 2020, 15 pages.

U.S. Appl. No. 17/135,616 , Non-Final Office Action, Mailed on Aug. 17, 2022, 17 pages.

U.S. Appl. No. 17/135,616 , Non-Final Office Action, Mailed on Mar. 16, 2023, 21 pages.

U.S. Appl. No. 17/135,616 , Notice of Allowance, Mailed on Oct. 4, 2023, 13 pages.

AU2018321284 , "Second Examination Report", Mar. 23, 2022, 3 pages.

AU2018353840 , "First Examination Report", Feb. 25, 2021, 3 pages.

Cho et al., "Design and Implementation of an Active RFID System Platform", Proceedings of the International Symposium on Applications and the Internet Workshops, Jan. 23-27, 2006, 4 pages.

Application No. CN201880076616.3 , Office Action, Mailed on Aug. 23, 2021, 10 pages.

Gerhard , "ZU Container Berlin", Internet Article, Available Online at: https://de.wikipedia.org/wiki/Datei:ZU_Container_Berlin.JPG, Aug. 1, 2016, pp. 1-3.

Knill , "Pallet Tracking Leads RFID Applications", News Briefs, Material Handling Management 57.1, vol. 8, No. 2, Jan. 2002, 4 pages.

MAIK , "DB Kombibahnhof—Brucken Umsetzen Van Ikw Auf Zug", Internet Article, Available Online at: https://www.youtube.com/watch?v=koMM6HopqiM, Jul. 20, 2016, pp. 1-3.

Mohamed , "Detection and Tracking of Pallets using a Laser Rangefinder and Machine Learning Techniques", Available Online At: https://www.researchgate.net/profile/Ihab_S_Mohamed/publication/324165524_Detection_and_Tracking_of_Pallets_using_a_Laser_Rangefinder_and_Machine_Learning_Techniques/links/5a02b5300f7e9bfc045f3547/Detection-and-Tracking-of-Pallets, Sept. 22, 2017, 76 pages.

Application No. PCT/US2018/026461 , International Preliminary Report on Patentability, Mailed on Jun. 25, 2019, 25 pages.

Application No. PCT/US2018/026461 , International Search Report and Written Opinion, Mailed on Jul. 5, 2018, 14 pages.

Application No. PCT/US2018/030659 , International Preliminary Report on Patentability, Mailed on Aug. 7, 2019, 19 pages.

Application No. PCT/US2018/030659 , International Search Report and Written Opinion, Mailed on Aug. 3, 2018, 14 pages.

Application No. PCT/US2018/030672 , International Preliminary Report on Patentability, Mailed on Nov. 5, 2019, 8 pages.

Application No. PCT/US2018/030672 , International Search Report and Written Opinion, Mailed on Jul. 13, 2018, 13 pages.

Application No. PCT/US2018/031367 , International Preliminary Report on Patentability, Mailed on Sep. 6, 2019, 8 pages.

Application No. PCT/US2018/031367 , International Search Report and Written Opinion, Mailed on Aug. 1, 2018, 13 pages.

Application No. PCT/US2018/031367 , Written Opinion, Mailed on Jul. 5, 2019, 5 pages.

Application No. PCT/US2018/034083 , International Preliminary Report on Patentability, Mailed on Dec. 5, 2019, 7 pages.

Application No. PCT/US2018/034083 , International Search Report and Written Opinion, Mailed on Oct. 24, 2018, 11 pages.

Application No. PCT/US2018/045964, International Preliminary Report on Patentability, Mailed on Apr. 30, 2020, 8 pages.

Application No. PCT/US2018/045964 , International Search Report and Written Opinion, Mailed on Nov. 19, 2018, 12 pages.

Application No. PCT/US2018/047035 , International Preliminary Report on Patentability, Mailed on Mar. 5, 2020, 8 pages.

Application No. PCT/US2018/047035 , International Search Report and Written Opinion, Mailed on Oct. 31, 2018, 12 pages.

Application No. PCT/US2018/048832 , International Preliminary Report on Patentability, Mailed on May 7, 2020, 7 pages.

Application No. PCT/US2018/048832 , International Search Report and Written Opinion, Mailed on Oct. 30, 2018, 14 pages.

Application No. PCT/US2019/068476 , International Search Report and Written Opinion, Mailed on Feb. 25, 2020, 13 pages.

Application No. PCT/US2020/019698 , International Preliminary Report on Patentability, Mailed on Sep. 2, 2021, 14 pages.

Application No. PCT/US2020/019698 , International Search Report and Written Opinion, Mailed on Jun. 30, 2020, 20 pages.

Roussel , "Making the Supply Chain Everyone's Business", Supply Chain, May 9, 2014, 8 pages.

Ryoo et al., "Geo-Fencing: Geographical-Fencing Based Energy-Aware Proactive Framework for Mobile Devices", Quality of Service, 2012 Institute of Electrical and Electronics Engineers 20th International Workshop, Jun. 4, 2012, pp. 1-9.

Weber et al., "Untrusted Business Process Monitoring and Execution Using Blockchain", Medical Image Computing and Computer-Assisted Intervention—Miccai 2015 : 18th International Conference, Sep. 8, 2016, pp. 329-347.

Xin et al., "Large Visual Repository Search with Hash Collision Design Optimization", Institute of Electrical and Electronics Engineers Service Center, vol. 20, Issue 2, Apr. 2013, pp. 62-71.

Yang et al., "Hybrid Cargo-Level Tracking System for Logistics", Institute of Electrical and Electronics Engineers 71st Vehicular Technology Conference, 2010, pp. 1-5.

* cited by examiner

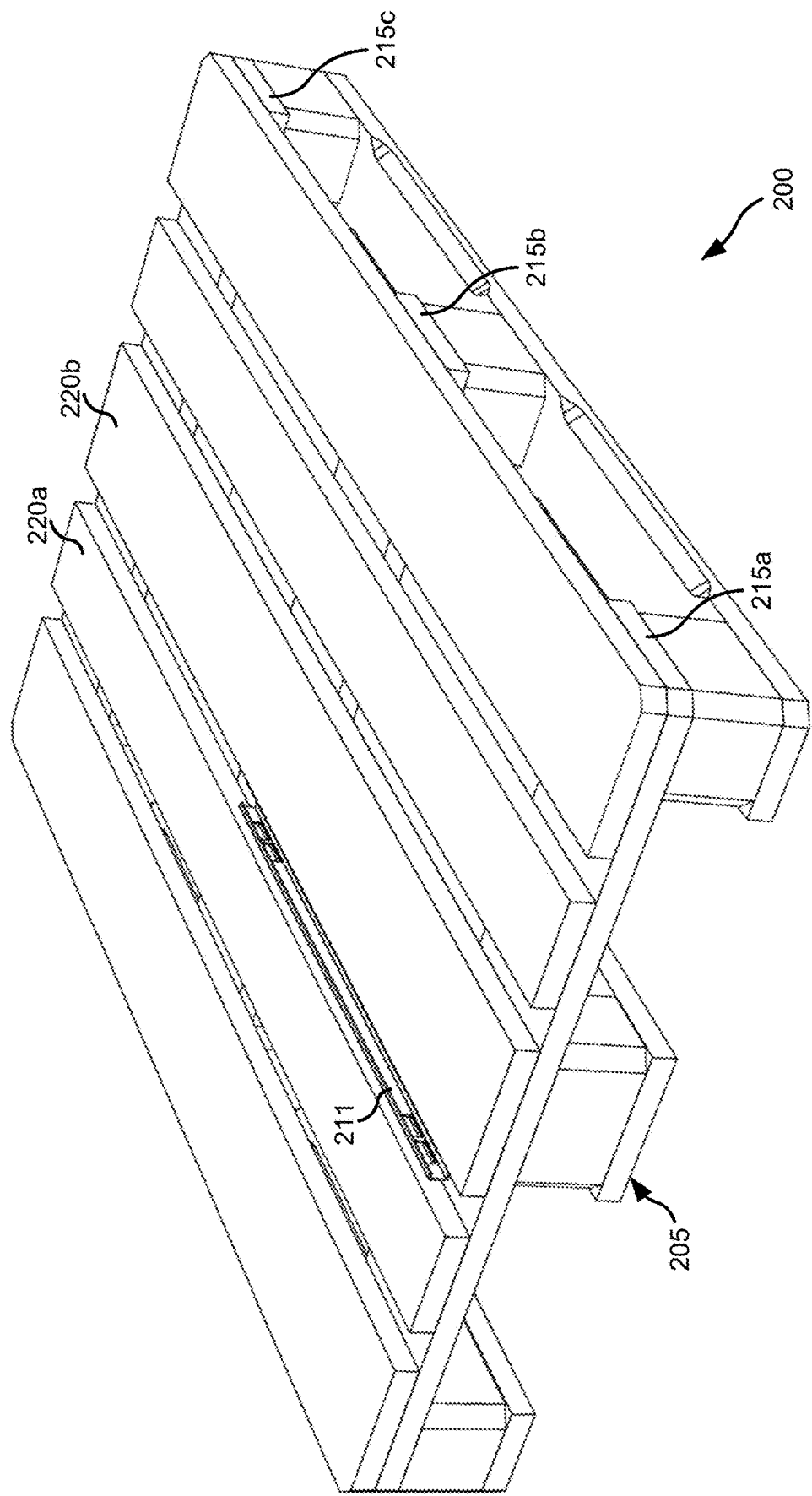

PLACEMENT OF TRACKING DEVICES ON PALLETS

CROSS-REFERENCES TO RELATED APPLICATIONS

This application is a divisional of U.S. application Ser. No. 17/135,616 filed Dec. 28, 2020, which is incorporated herein by reference. U.S. application Ser. No. 17/135,616 is a divisional of U.S. application Ser. No. 15/972,835 filed Dec. 28, 2020 filed May 7, 2018 (now issued U.S. Pat. No. 10,878,366), which is incorporated herein by reference. U.S. Application Ser. No. 17/135,616 claims the benefit of U.S. Provisional Application No. 62/502,280 filed May 5, 2017, which is incorporated herein by reference.

FIELD

The present disclosure generally relates to cargo transportation utilizing pallets, and more specifically to the placement of tracking devices on pallets.

BACKGROUND

Monitoring pallet movement through a supply and distribution chain can aid in diagnosing issues with pallet loss and recovery, pallet damage and pallet cycle time. To achieve comprehensive monitoring, each pallet must be labeled with a unique identifier. In some systems, these identifiers are stored in tracking devices attached to the pallets. This may allow the pallet to be tracked as it moves through the supply chain.

BRIEF SUMMARY

Provided are pallets attached to or incorporating tracking devices. According to some embodiments of the invention, a pallet may be identified and/or tracked using data obtained from the tracking devices. Thus, the status of pallets may be monitored (e.g., their location and other data) as they move through the supply chain.

According to some embodiments of the invention, a trackable transport structure is provided. The trackable transport structure comprises a pallet including a plurality of blocks and a plurality of beams. The pallet comprises a block having a cavity, a lower longitudinal beam coupled to a bottom side of the block, and an upper longitudinal beam coupled to a top side of the block. The upper longitudinal beam is substantially perpendicular to the lower longitudinal beam. The trackable transport structure further comprises a tracking device coupled to a portion of the pallet. The tracking device comprises one or more electronic components disposed within the cavity and an antenna coupled to the one or more electronic components.

According to some embodiments of the invention, a trackable transport structure is provided. The trackable transport structure comprises a pallet including a plurality of blocks and a plurality of beams. The pallet comprises a first lower longitudinal beam, a second lower longitudinal beam being substantially parallel to the first lower longitudinal beam, a first upper longitudinal beam being coupled to a top side of the first lower longitudinal beam and coupled to a top side of the second lower longitudinal beam, and a second upper longitudinal beam being coupled to the top side of the first lower longitudinal beam and coupled to the top side of the second lower longitudinal beam. The second upper longitudinal beam is substantially parallel to the first upper longitudinal beam. The trackable transport structure further comprises a strut coupled to the top side of the first lower longitudinal beam and coupled to the top side of the second lower longitudinal beam. The strut is substantially parallel to the first upper longitudinal beam and the second upper longitudinal beam. The trackable transport structure further comprises a tracking device. The tracking device comprises one or more electronic components disposed within the strut, and an antenna coupled to the one or more electronic components.

According to some embodiments of the invention, a trackable transport structure is provided. The trackable transport structure comprises a pallet including a plurality of blocks and a plurality of beams including a longitudinal beam. The longitudinal beam includes a cavity accessible at a bottom side of the longitudinal beam. The trackable transport structure further comprises a casing coupled to the bottom side of the longitudinal beam. The casing includes a cavity region at least partially aligned with the cavity of the longitudinal beam. The trackable transport structure further comprises a tracking device coupled to one or both of the cavity of the longitudinal beam and the cavity region of the casing. The tracking device comprises one or more electronic components disposed within the cavity and an antenna coupled to the one or more electronic components.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIG. 6A shows a representation of a trackable transport structure, according to some embodiments of the present disclosure;

Figure 1:
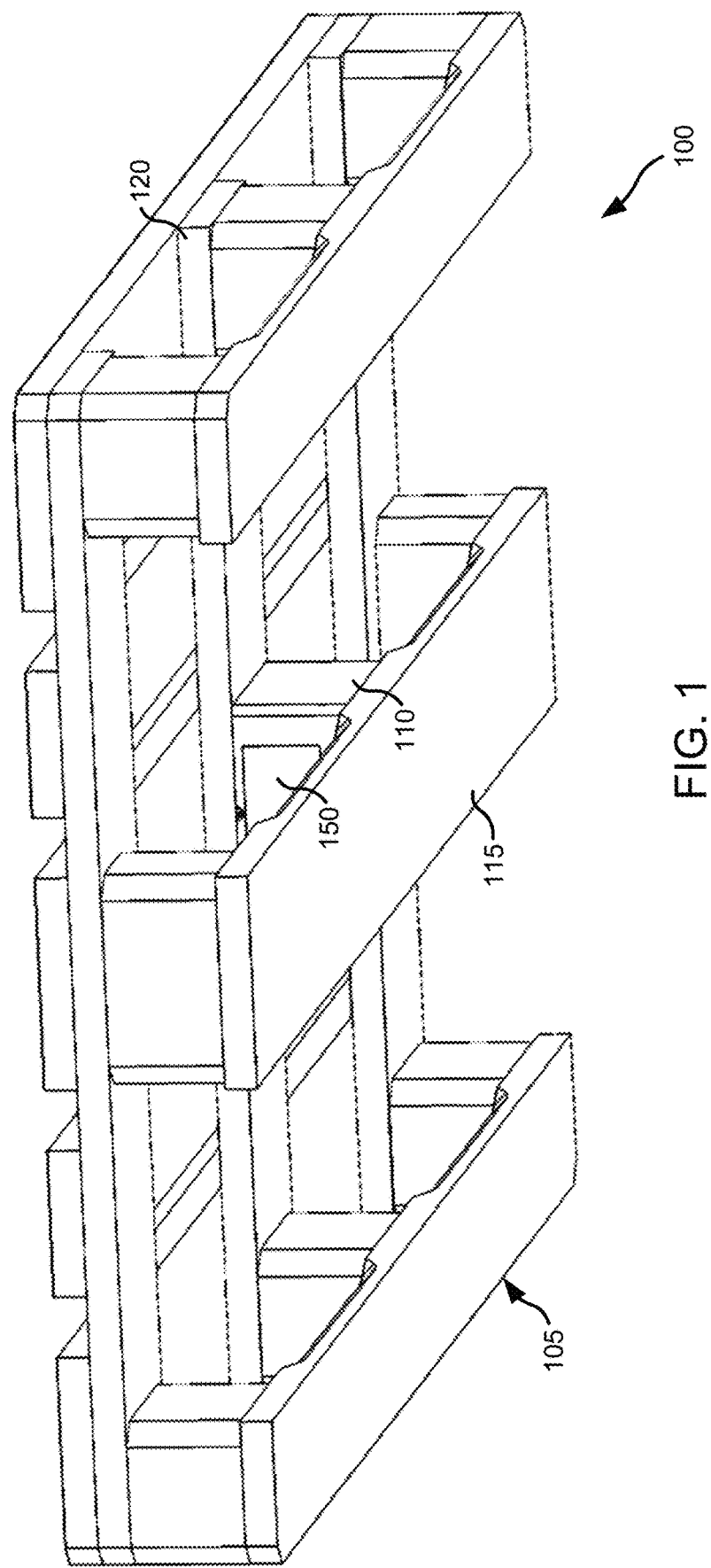
FIG. 1 shows a representation of a trackable transport structure, according to some embodiments of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Attaching electronic devices such as tracking devices to storage pallets presents numerous challenges. For example, attached devices that remain at least partially exposed are susceptible to damage from outside conditions as well as damage from forklift maneuvering during normal pallet usage. Additionally, damage to devices that include a power source such as a battery may lead to explosion and/or ignition of the power source. Because typical pallet construction includes various types of wood, prevention of battery explosion and/or ignition of the power source may be particularly important.

Embodiments of the present disclosure include three approaches for attaching devices to pallets in a way that minimizes and/or mitigates the problems associated with the above-described challenges. In a first approach of the present disclosure (described in reference to FIGS. 1, 2, 3A, 3B, 4, 5A, 5B, and 5C), a trackable transport structure is provided having one or more electronic components of a tracking device disposed within a cavity of a block (e.g., center block of a pallet). By placing the device inside the block, the device is protected from being damaged from forklift maneuvering during normal pallet usage. Furthermore, the materials of the block can serve as a type of thermal insulator to protect the device's batteries from outside conditions.

In a second approach of the present disclosure (described in reference to FIGS. 6A, 6B, 6C, 7, 8, 9, 10A, and 10B), a trackable transport structure is provided having one or more electronic components of a tracking device disposed within a strut that interfaces between two beams of a pallet. The strut may extend parallel to the two beams, and may extend a full length of the pallet or a half-length of the pallet. The strut has a depth that is less than or equal to the depth of the two beams such that items stored on the pallet do not physically contact the strut. The tracking device may be inserted into the strut from a lateral direction or from an upward vertical direction. The tracking device may include an antenna facing an upward vertical direction, a downward vertical direction or a lateral direction.

In a third approach of the present disclosure (described in reference to FIGS. 11, 12, and 13), a trackable transport structure is provided having one or more electronic components of a tracking device disposed within a cavity of a beam. The cavity may be accessible at the bottom side of the beam. For structural support and protection, the beam may be coupled to a casing such that the casing is coupled to the bottom side of the beam and includes a cavity region (e.g., an aperture, a concave portion, etc.) that is at least partially aligned with the cavity of the beam. The tracking device may include a first antenna positioned within the cavity and facing an upward vertical direction or a downward vertical direction, and a second antenna positioned on a lateral end of the beam facing an outward lateral direction.

As described herein, the term "tracking device" may refer to any electronic device that records or detects data related to one or more of: position/location, velocity, acceleration, distance, rotation, altitude, temperature, humidity, pressure, sound, light, capacitance, inductance, resistance, voltage, chemical presence, and the like. The tracking device may record data continuously, semi-continuously (e.g., every 100 ms), intermittently, periodically, upon request and/or upon satisfaction of one or more criteria. The tracking device may use one type of recorded data to estimate another type of data (e.g., use recorded temperature and/or humidity data to estimate position data, or use recorded distance data using three different satellites to estimate position data).

In many instances, it is desirable to convert raw measurements recorded by the tracking device into more sophisticated, usable data via post-processing of the raw measurements (e.g., convert satellite distance data into a position estimate of the tracking device). In some embodiments, the tracking device may include one or more processors such that post-processing of raw measurements may be performed directly within the tracking device. In other embodiments, the tracking device may communicate and/or store the raw measurements such that a remote device including one or more processors may retrieve the raw measurements and perform the post-processing within the remote device. The tracking device may communicate with the remote device through a wired or wireless communication channel (e.g., using an IEEE 802.11 protocol). In some instances, a memory device coupled to the tracking device may be physically removed/detached from the tracking device and be uploaded to the remote device.

Tracking devices described herein may be operable within any one of various wireless communication technologies. For example, a tracking device described herein may be operable within any of the currently operating global navigation satellite systems (GNSS), such as the United States'

Global Positioning System (GPS), the Russian Global Navigation Satellite System (GLONASS), the Chinese BeiDou Satellite Navigation System, and the European Union's (EU) Galileo. A tracking device may include an antenna, a radio-frequency (RF) front end, and one or more processors. The antenna may be used to receive and/or transmit various wireless signals. Wireless signals received by the antenna may be sent to the RF front end where digital samples are generated and routed to the one or more processors. The one or more processors may generate a position estimate of the tracking device based on the generated samples, and the position estimate may be transmitted to a separate device that monitors the current position of the tracking device. Other tracking techniques are also possible, such as techniques that use cellular networks.

As described herein, a pallet may be any structure that supports physical assets for storage, presentation, handling, and/or transportation. As used herein, the term "pallet" may be used to describe any load carrier, including any type of platform, dolly, bin, container, and the like. The physical assets may be any physical assets, such as perishable or nonperishable physical goods. The pallet may include a plurality of beams and blocks, and may be of any size, shape, and/or dimension, and may be made of any material or combination of materials. The beams and blocks may be of any size, shape, and/or dimensions, and may be fastened together to form the pallet, or may be formed as a single unitary molded body. The top surface of the pallet may be flat and/or otherwise configured to support the shape and/or weight of the physical asset to be held on the pallet. Although shown as having a particular design in the various figures, it is contemplated that any design may be incorporated on or in the pallet. The beams and blocks may be sized and positioned to support the particular physical asset. In some embodiments, the blocks may be sized and positioned to allow a forklift, crane, or jacking device to engage and lift the pallet between the blocks. A pallet may be made of any suitable material, including wood, plastic, metal, and/or the like.

Referring now to FIG. 1, a perspective view of a trackable transport structure 100 is shown, according to some embodiments of the present disclosure. Trackable transport structure 100 includes a tracking device 150 that is secured, attached, connected, and/or coupled to a portion of a pallet 105. As described above, pallet 105 may be any type of flat transport structure that supports physical assets while being lifted by a forklift, front loader, pallet jack, crane, etc. In some embodiments, pallet 105 includes a plurality of blocks and beams (e.g., boards) fastened together through one or more of several fastening means including nails, screws, glue, tape, ropes, strings, wires, cables, chains, hinges, magnets, and the like. In some embodiments in which the pallet 105 is plastic, for example, the pallet 105 including the blocks and beams may comprise a single molded unitary body. The blocks and beams may be composed of one or more of several types of materials including wood, plastic, metal, composite, and the like, and may have various shapes and dimensions. For example, the blocks of pallet 105 may be of a roughly cubic shape and may have a roughly square or a roughly rectangular cross section. As shown in FIG. 1, pallet 105 may include nine blocks coupled on the top side and bottom side to longitudinal beams (i.e., beams that extend in the longitudinal and/or the lateral direction). Various rows and layers of longitudinal beams may be incorporated into pallet 105 to give trackable transport structure 100 additional strength and rigidity as needed for a particular application.

One or more of the blocks of pallet 105 may be hollow or partially hollow such that one or more components of tracking device 150 may be disposed in the interior of one or more blocks. For example, a block 110 at the center of pallet 105 may include a cavity having a shape at least as large as the tracking device 150 such that the tracking device 150 may be completely enclosed by the cavity. Enclosing tracking device 150 in block 110 reduces the potential damage due to impacts from the forks of a forklift. In some instances, one or more components of tracking device 150, such as an antenna, may be positioned either inside the cavity of block 110 or on an exterior surface of block 110 (e.g., top side, bottom side, four lateral sides) or on an exterior surface of some other component of pallet 105. For example, because electromagnetic waves generated and/or received from the antenna may be distorted and/or blocked by items placed on pallet 105 as well as by the material of pallet 105 itself, the antenna may be positioned in an antenna cavity 113 on a lateral exterior surface of block 110.

Although tracking device 150 is shown in FIG. 1 as being coupled to block 110, in some embodiments tracking device 150 may be coupled to any of the non-center blocks of pallet 105. For example, in some embodiments certain non-center blocks may provide better damage protection and/or better antenna performance than block 110. In some embodiments, to provide further protection from damage, tracking device 150 may be wrapped in bubble wrap or some other protective material.

In some embodiments, a top side of a lower longitudinal beam 115 is coupled to a bottom side of block 110, and a bottom side of an upper longitudinal beam 120 is coupled to a top side of block 110. Lower longitudinal beam 115 may be perpendicular or parallel to upper longitudinal beam 120, or may form some angle with respect to upper longitudinal beam 120. In some embodiments, block 110 is coupled to a center portion of lower longitudinal beam 115 and a center portion of upper longitudinal beam 120. In some embodiments, block 110 is coupled to a center portion of lower longitudinal beam 115 and an end portion of upper longitudinal beam 120. In some embodiments, block 110 is coupled to an end portion of lower longitudinal beam 115 and a center portion of upper longitudinal beam 120. In some embodiments, block 110 is coupled to an end portion of lower longitudinal beam 115 and an end portion of upper longitudinal beam 120.

Figure 2:
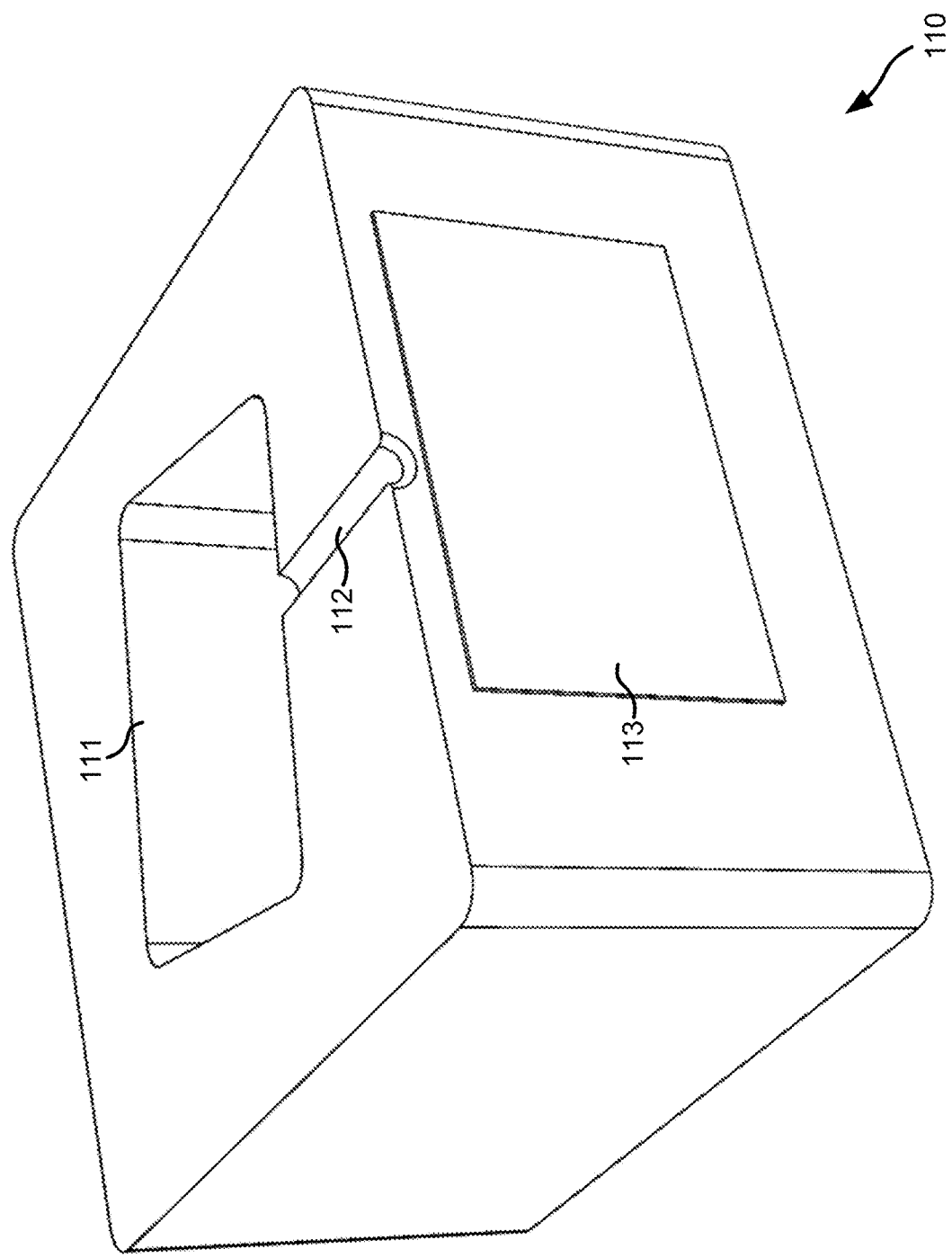
FIG. 2 shows a representation of a block, according to some embodiments of the present disclosure.

Referring now to FIG. 2, a perspective view of block 110 is shown, according to some embodiments of the present disclosure. In some instances, block 110 includes a device cavity 111 for enclosing one or more components of tracking device 150, a wire cavity 112 for enclosing an antenna lead of tracking device 150, and an antenna cavity 113 for enclosing an antenna of tracking device 150. In some instances, antenna cavity 113 is sized such that it is 1 mm to 10 mm in depth such that a relatively flat antenna (e.g., patch antenna) having a similar or smaller depth may be coupled to antenna cavity 113 and may receive reduced damage from glancing impacts to block 110. Optionally, instead of wire cavity 112 extending along an exterior surface of block 110 as shown in FIG. 2, it may include a cylindrical tunnel extending from a center portion of device cavity 111 through to a center portion of antenna cavity 113.

As shown in FIG. 2, device cavity 111 may be rotated/oriented such that the majority or all of the cut lines are not parallel to the grain of the wood (e.g., in embodiments in which block 110 is composed of wood). For example, when the grain of the wood runs parallel to any of the exterior surfaces of block 110, device cavity 111 may be rotated/ oriented such that the cut lines of device cavity 111 are not parallel to exterior surfaces of block 110. By configuring block 110 as described, the lifespan of the block is improved by reducing the probability of structural failure due to collapsing along a grain of the wood.

Figure 3A:
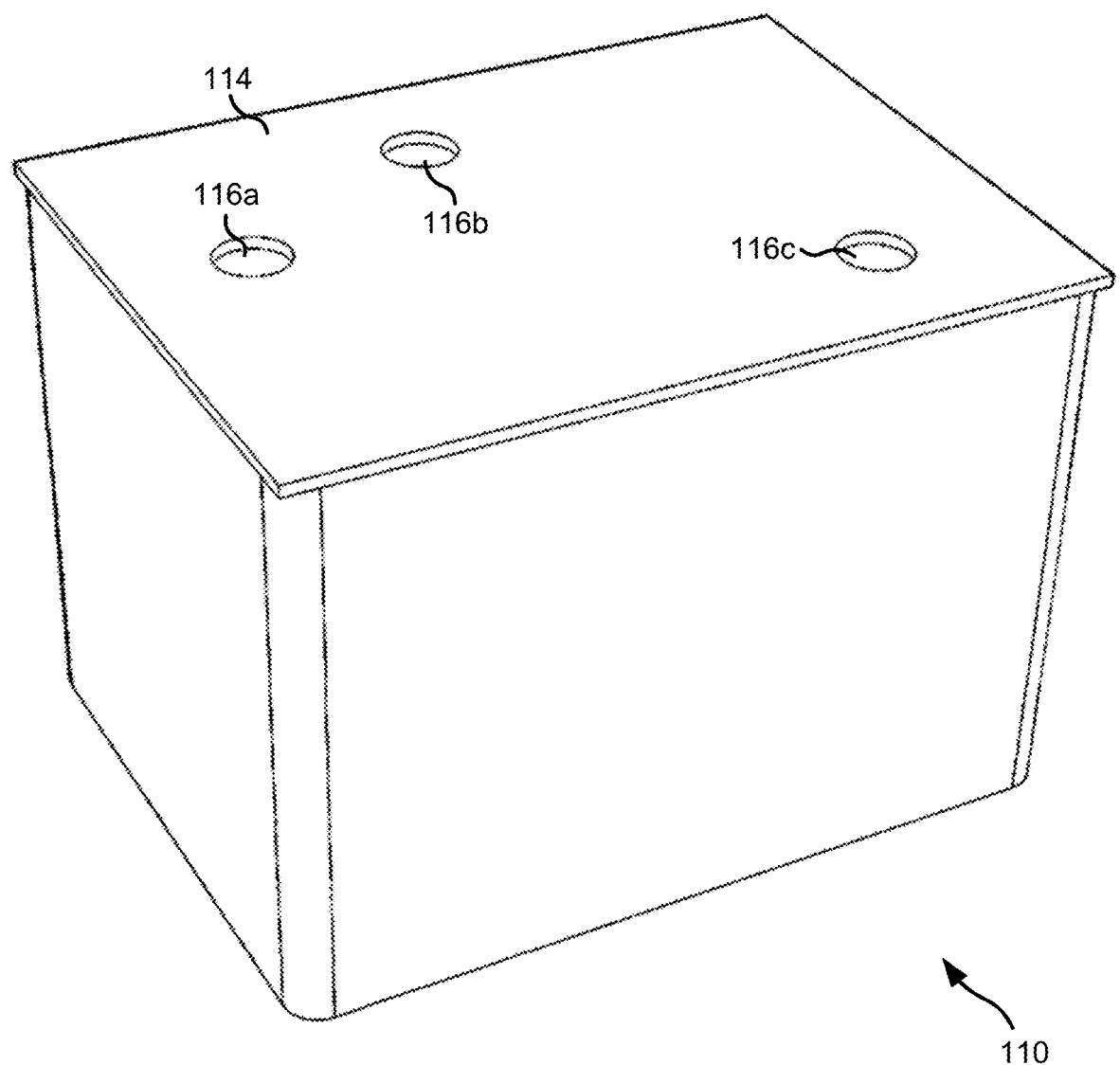
FIG. 3A shows a representation of a block, according to some embodiments of the present disclosure.

Referring now to FIG. 3A, a perspective view of block 110 with a cover 114 is shown, according to some embodiments of the present disclosure. Cover 114 may be a metal plate (e.g., steel plate) having one or more apertures 116 and may be coupled to a top side and/or a bottom side of block 110. Apertures 116 may serve as screw or nail holes allowing block 110 to be fastened using screws or nails penetrating into block 110 via apertures 116. Cover 114 provides a protective layer for tracking device 150 without compromising the ability to fasten block 110 to surrounding beams. Cover 114 may be provided on both the top side and the bottom side of block 110, and may be positioned such that it is not aligned with antenna cavity 113.

Figure 3B:
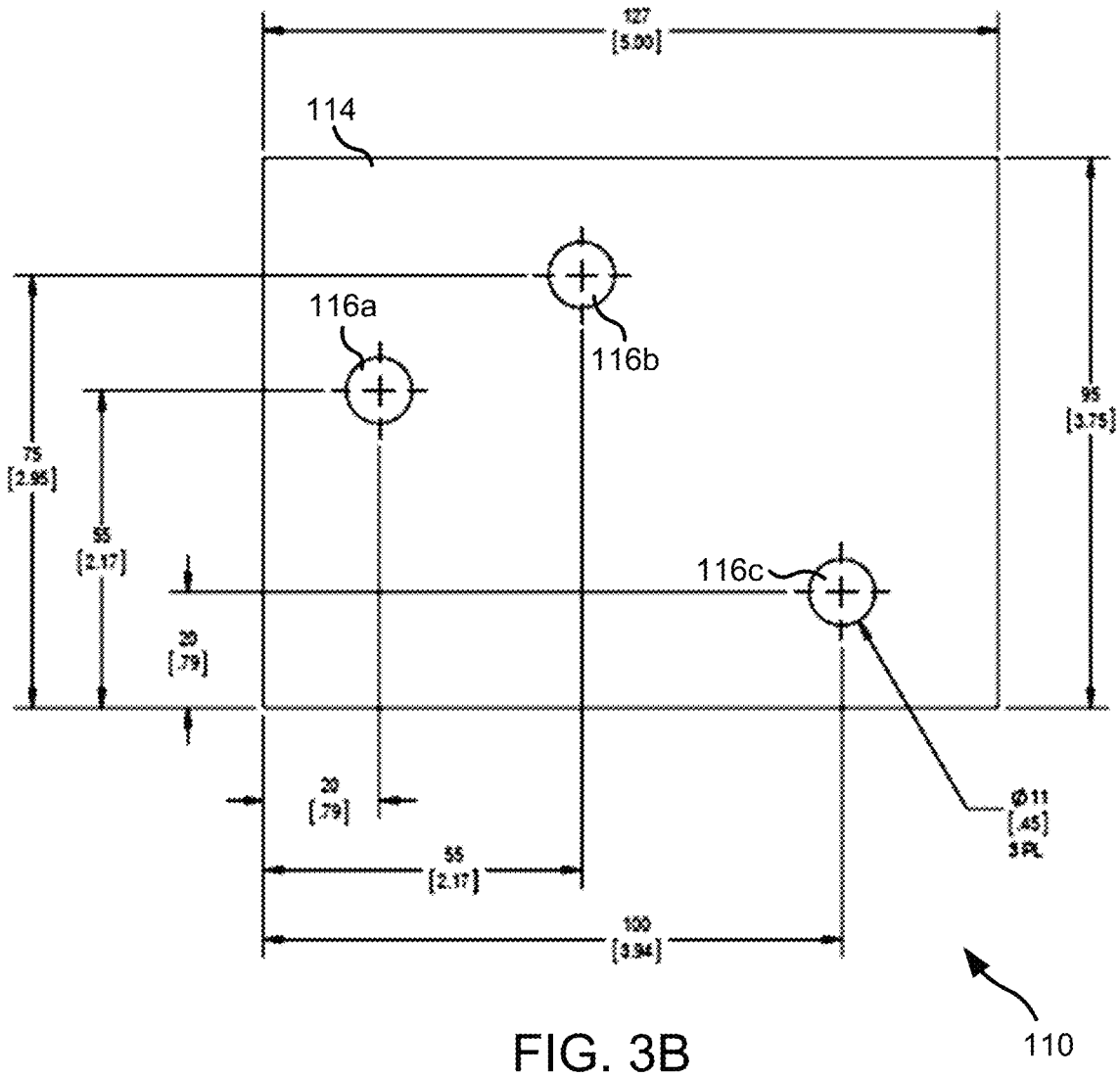
FIG. 3B shows a representation of a block, according to some embodiments of the present disclosure.

Referring now to FIG. 3B, a top view of block 110 with cover 114 is shown, according to some embodiments of the present disclosure. Non-bracketed dimensions are in mm and bracketed dimensions are in inches. In general, the diameters of apertures 116 are such that screws or nails may be reliably inserted and the locations of apertures 116 are such that no components of tracking device 150 may be interfered with by the screws or nails.

Figure 4:
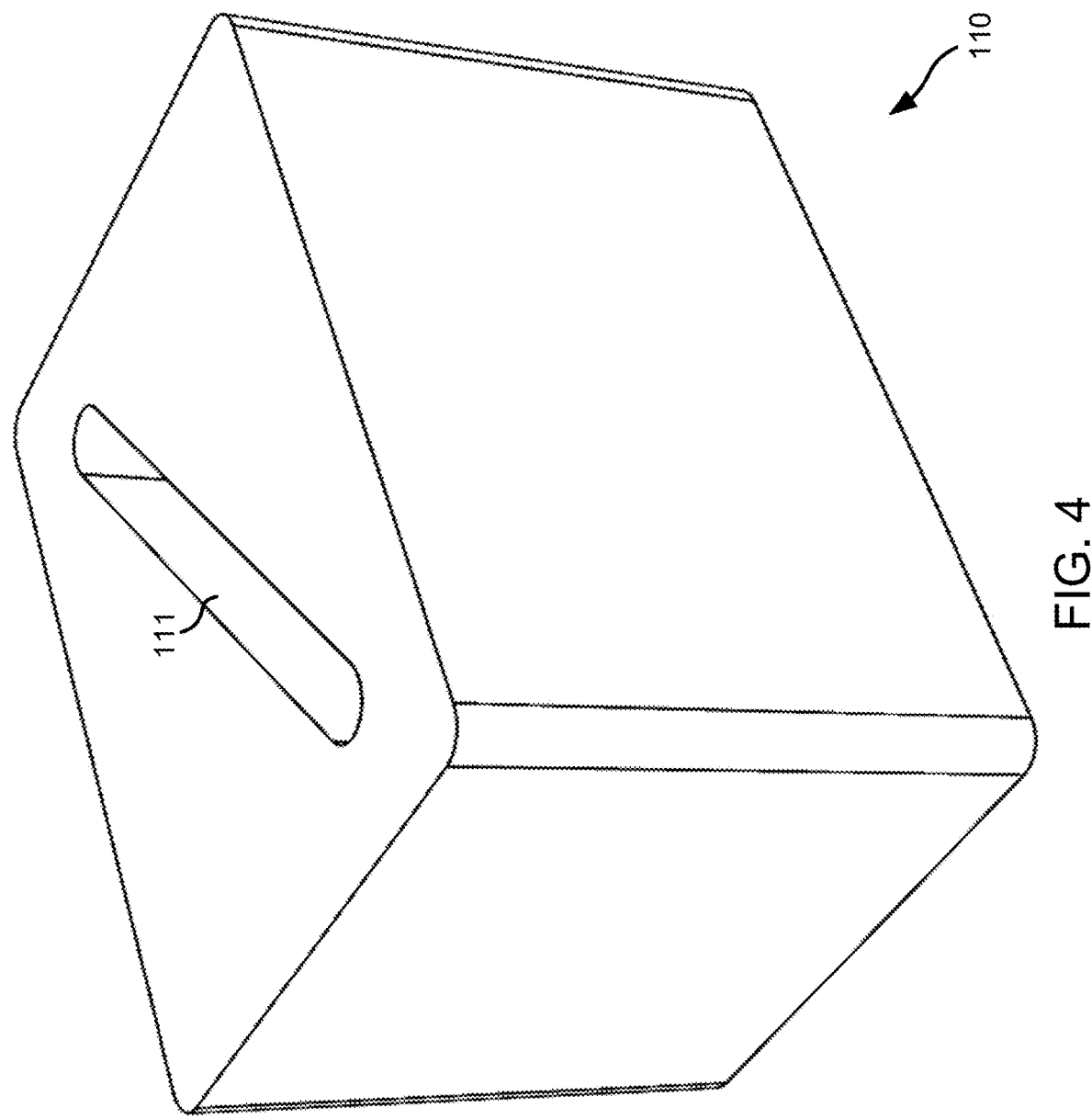
FIG. 4 shows a representation of a block, according to some embodiments of the present disclosure.

Referring now to FIG. 4, a perspective view of block 110 is shown, according to some embodiments of the present disclosure. Block 110 may include a roughly diagonal device cavity 111 that roughly extends from one corner of block 110 to an opposite corner of block 110. The antenna of tracking device 150 may be disposed within device cavity 111 such that it faces outward of block 110 at an angle.

Figure 5A:
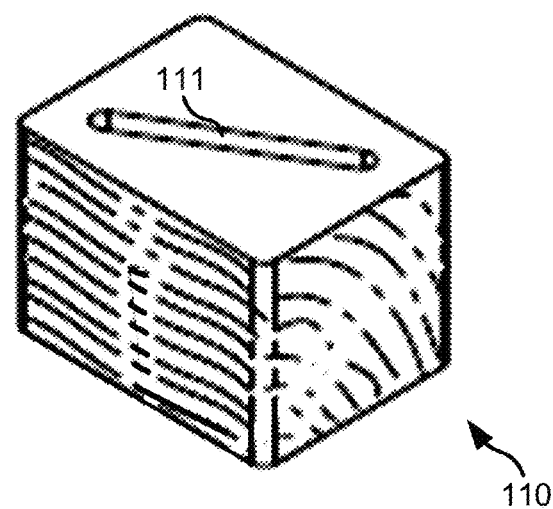
FIG. 5A shows a representation of a block, according to some embodiments of the present disclosure.
Figure 5B:
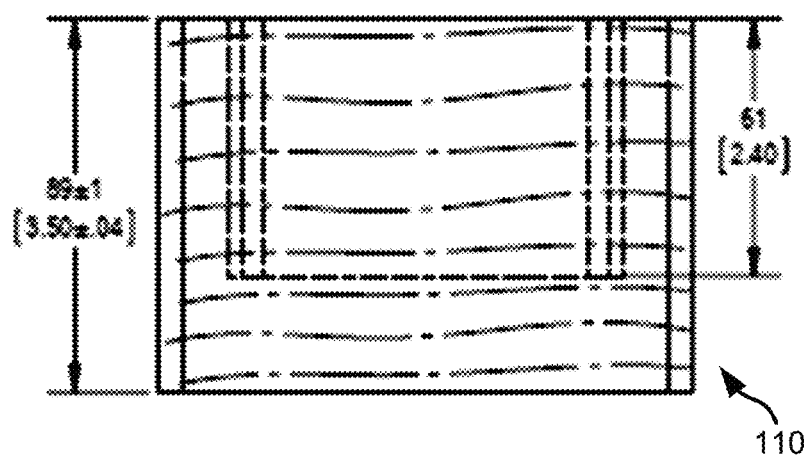
FIG. 5B shows a representation of a block, according to some embodiments of the present disclosure.
Figure 5C:
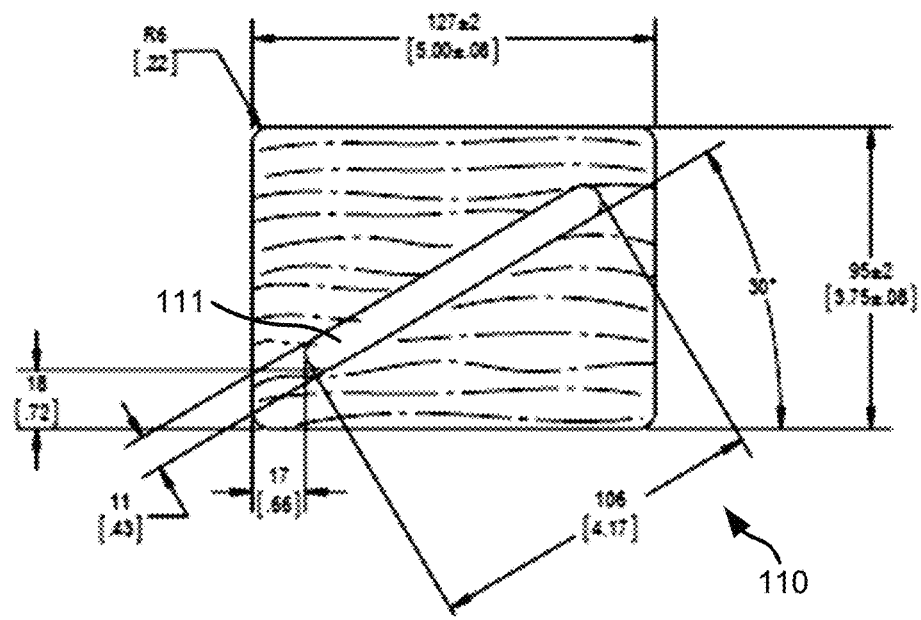
FIG. 5C shows a representation of a block, according to some embodiments of the present disclosure.

Referring now to FIGS. 5A, 5B, and 5C, a perspective view, a side view, and a top view of block 110 are shown, respectively, according to some embodiments of the present disclosure. Non-bracketed dimensions are in mm and bracketed dimensions are in inches. In reference to FIG. 5C, it can be observed that device cavity 111 may be cut such that no cut lines are parallel to the grain of the wood.

Referring now to FIG. 6A, a perspective view of a trackable transport structure 200 is shown, according to some embodiments of the present disclosure. One or more properties of trackable transport structure 200 and pallet 205 may be similar to those described in reference to trackable transport structure 100 and pallet 105. Trackable transport structure 200 may include a half-length strut 211 that is coupled to a top side of a lower longitudinal beam 215a and to a top side of a lower longitudinal beam 215b. Half-length strut 211 may extend and interface between an upper longitudinal beam 220a and an upper longitudinal beam 220b. Upper longitudinal beam 220a may be coupled to the top side of lower longitudinal beam 215a and may be coupled to the top side of lower longitudinal beam 215b. Similarly, upper longitudinal beam 220b may be coupled to the top side of lower longitudinal beam 215a and may be coupled to the top side of lower longitudinal beam 215b. Upper longitudinal beam 220a may be parallel to upper longitudinal beam 220b, and both upper longitudinal beams 220 may be parallel to half-length strut 211.

Although half-length strut 211 is shown in FIG. 6A as extending and interfacing between upper longitudinal beams 220a and 220b, it may be configured in a number of different positions. For example, in some embodiments, half-length strut 211 may be positioned between lower longitudinal beams 215a and 215b such that the top side of half-length strut 211 is coupled to the bottom side of one or more upper longitudinal beams 220. As another example, half-length strut 211 may be positioned between two blocks such that either the top side of half-length strut 211 is coupled to the bottom side of one or more longitudinal beams or the bottom side of half-length strut is coupled to the top side of one or more longitudinal beams, such as the beams below the blocks.

Figure 6B:
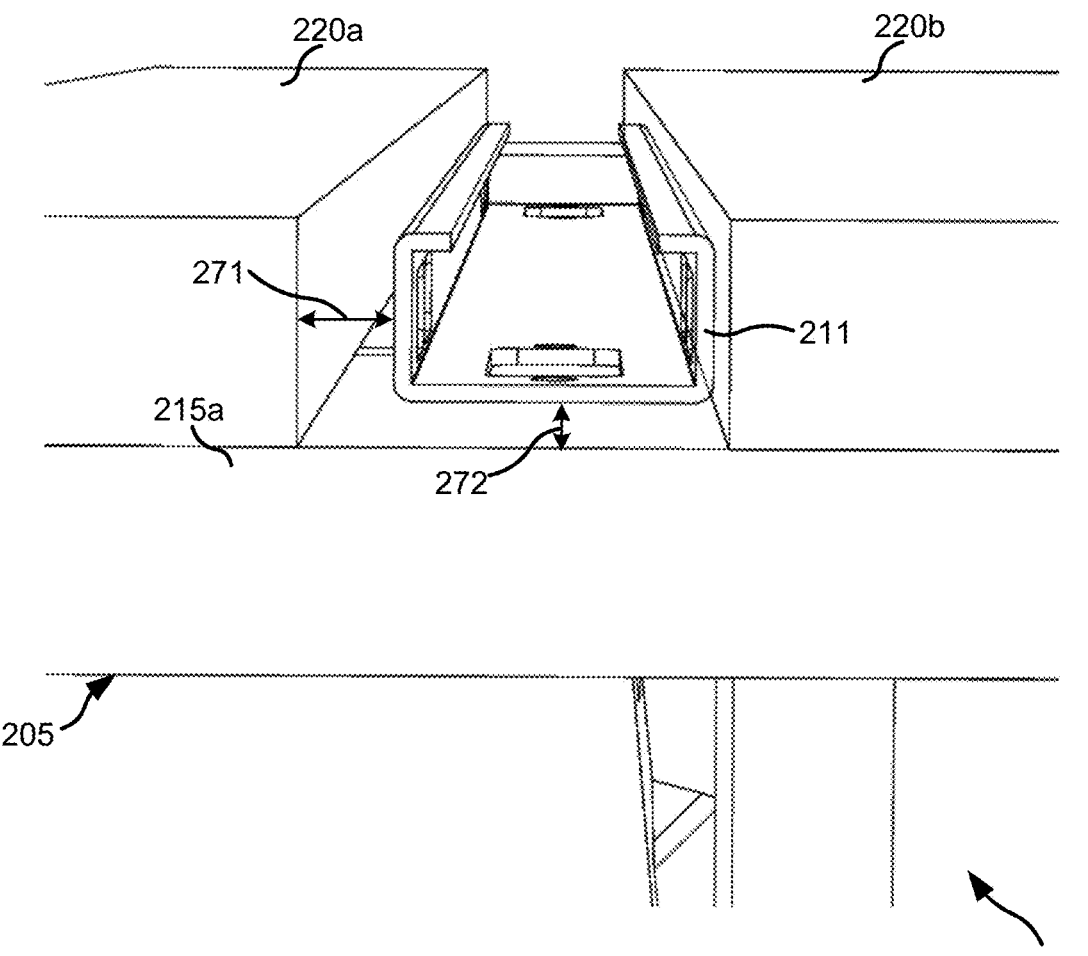
FIG. 6B shows a representation of a trackable transport structure, according to some embodiments of the present disclosure.

Referring now to FIG. 6B, a perspective view of trackable transport structure 200 is shown, according to some embodiments of the present disclosure. Half-length strut 211 may be configured such that its height is less than or equal to the height/depth of upper longitudinal beams 220. Furthermore, half-length strut 211 may be coupled to one or both of upper longitudinal beams 220a and 220b along the side of half-length strut 211. In a preferred embodiment of trackable transport structure 200, half-length strut 211 may be coupled to only one of upper longitudinal beams 220a and 220b along the side of half-length strut 211 such that a gap 271 exists between half-length strut 211 and one of the beams and such that independent movement of the two beams does not cause lateral compression of half-length strut 211. In another preferred embodiment of trackable transport structure 200, the length and positioning of half-length strut 211 is such that a gap 272 exists between half-length strut 211 and the edge of pallet 205 and such that impacts from the forks of a forklift or from adjacent pallets have reduced potential damage to half-length strut 211.

Figure 6C:
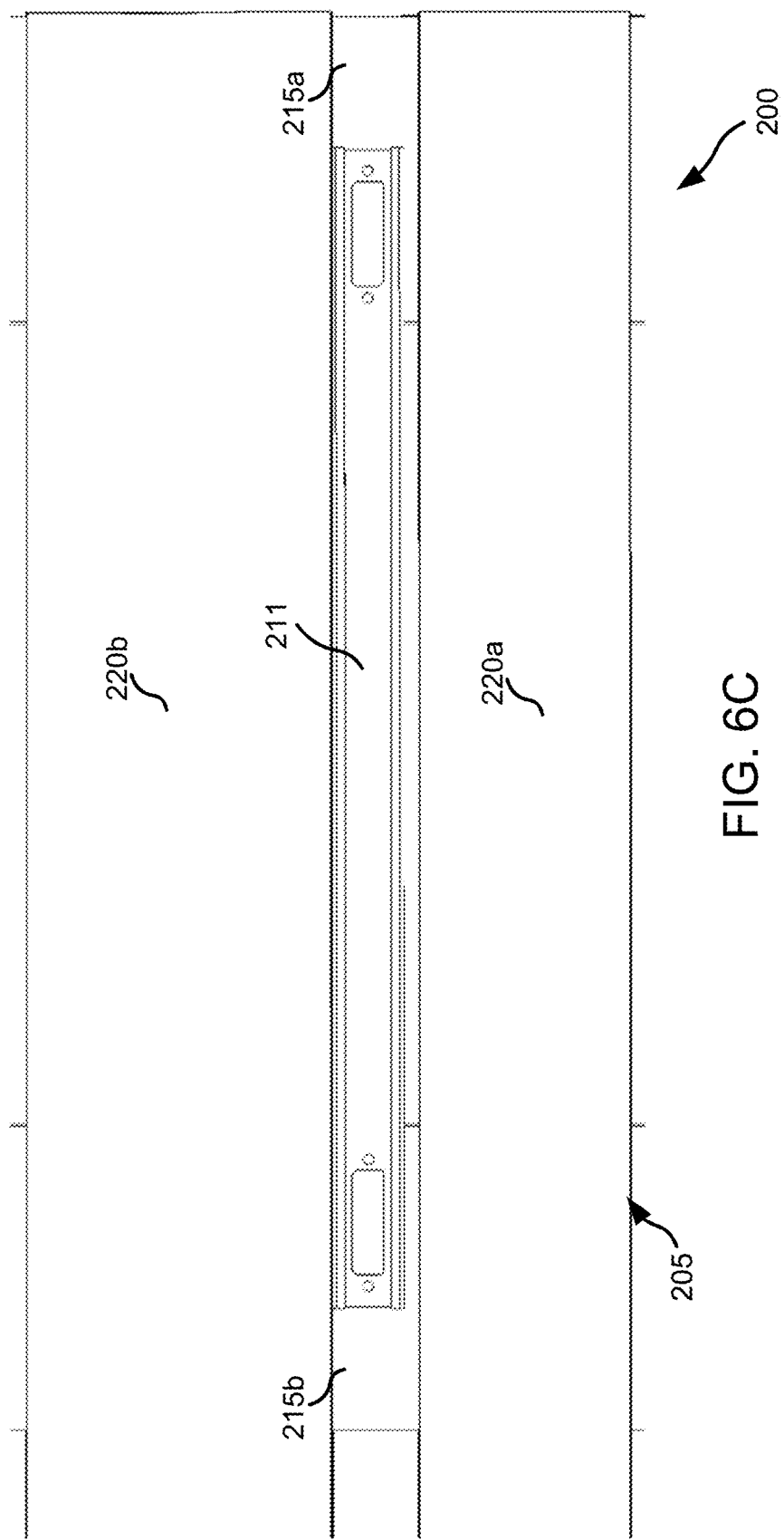
FIG. 6C shows a representation of a trackable transport structure, according to some embodiments of the present disclosure.

Referring now to FIG. 6C, a top view of trackable transport structure 200 is shown, according to some embodiments of the present disclosure. In some embodiments, half-length strut 211 is coupled to the top side of lower longitudinal beams 215a and 215b using screw or nail holes positioned on half-strut 211 such that two of the holes are aligned with lower longitudinal beam 215a and the other two holes are aligned with lower longitudinal beam 215b.

Figure 7:
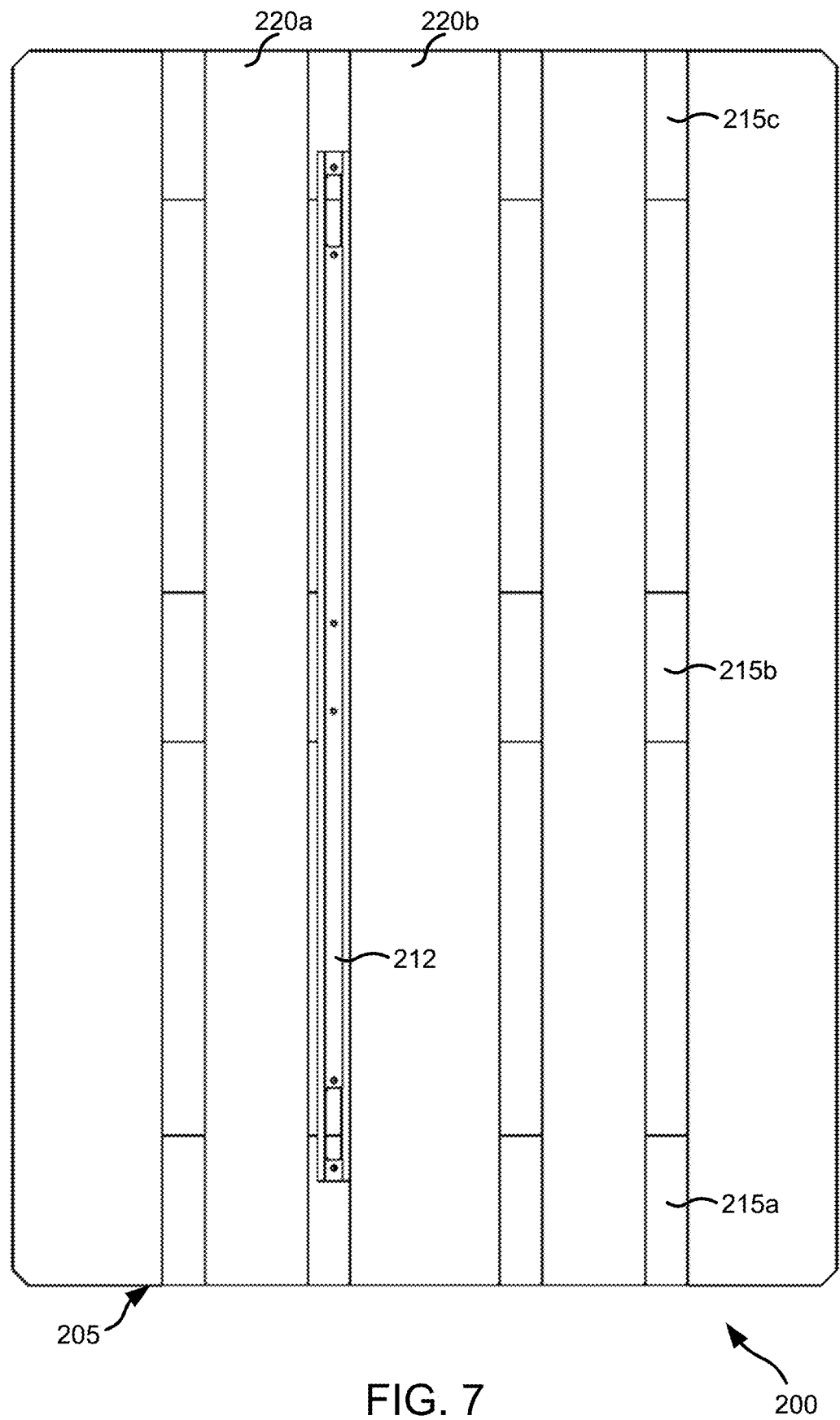
FIG. 7 shows a representation of a trackable transport structure, according to some embodiments of the present disclosure.

Referring now to FIG. 7, a top view of trackable transport structure 200 is shown, according to some embodiments of the present disclosure. Trackable transport structure 200 may include a full-length strut 212 that extends and interfaces between upper longitudinal beam 220a and upper longitudinal beam 220b, similar to half-length strut 211, but also couples to the top side of lower longitudinal beam 215c. The added length of full-length strut 212 compared to half-length strut 211 may provide improved stability of the strut because an additional securement point (i.e., lower longitudinal beam 215c) may be utilized. The added length also allows a larger device to be coupled with full-length strut 212 compared to half-length strut 211.

Figure 8:
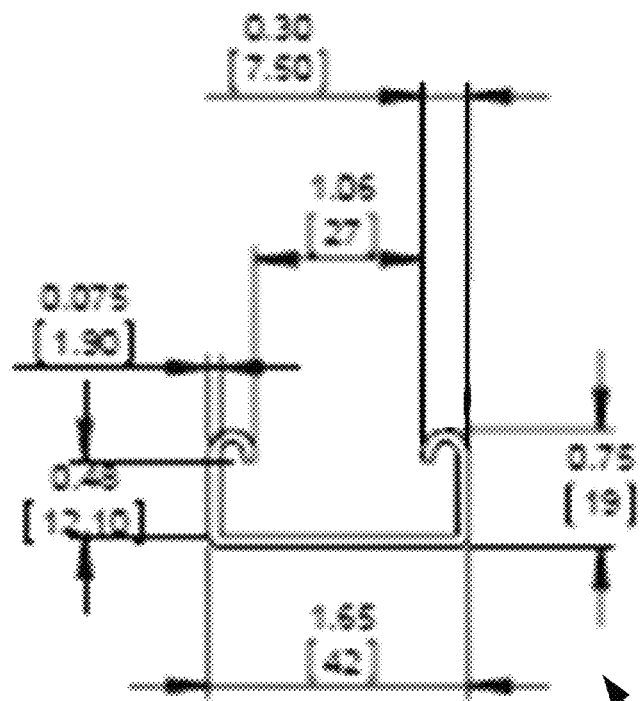
FIG. 8 shows a representation of a half-length strut, according to some embodiments of the present disclosure.

Referring now to FIG. 8, a side view of half-length strut 211 (or full-length strut 212) is shown, according to some embodiments of the present disclosure. Non-bracketed dimensions are in mm and bracketed dimensions are in inches. In some embodiments, half-length strut 211 (and similarly full-length strut 212) is configured such that a tracking device 250 (or a containing element surrounding a portion of tracking device 250) may be inserted into half-length strut 211 from the lateral end, from the top side, and/or from the bottom side of half-length strut 211. For example, tracking device 250 may include one or more components having a rectangular-shaped packaging which may be inserted into half-length strut 211 from the lateral end of half-length strut 211 such that the packaging is secured within half-length strut 211. As shown in FIG. 8, half-length strut 211 may include two U-shaped prongs that extend upward to secure tracking device 250. In some embodiments, portions of half-length strut 211 may include an impediment (e.g., a wall) to provide a stopping/resting point for tracking device 250 when it is inserted into half-length strut 211.

Figure 9:
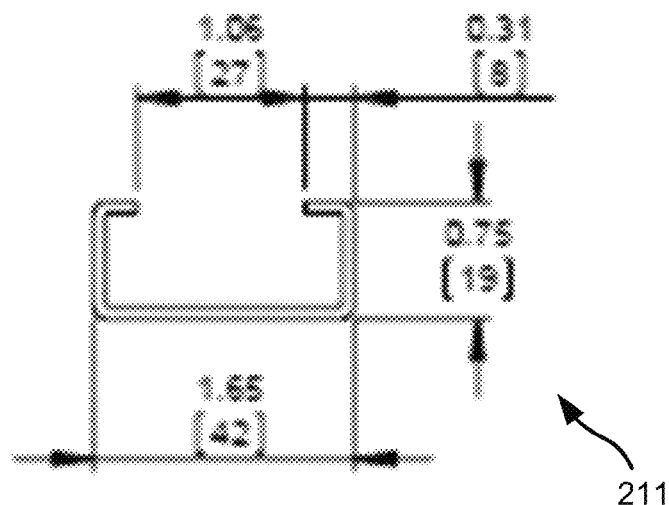
FIG. 9 shows a representation of a half-length strut, according to some embodiments of the present disclosure.

Referring now to FIG. 9, a side view of half-length strut 211 (or full-length strut 212) is shown, according to some embodiments of the present disclosure. Non-bracketed dimensions are in mm and bracketed dimensions are in inches. As shown in FIG. 9, half-length strut 211 may include two L-shaped prongs that extend upward to secure tracking device 250.

Figure 10A:
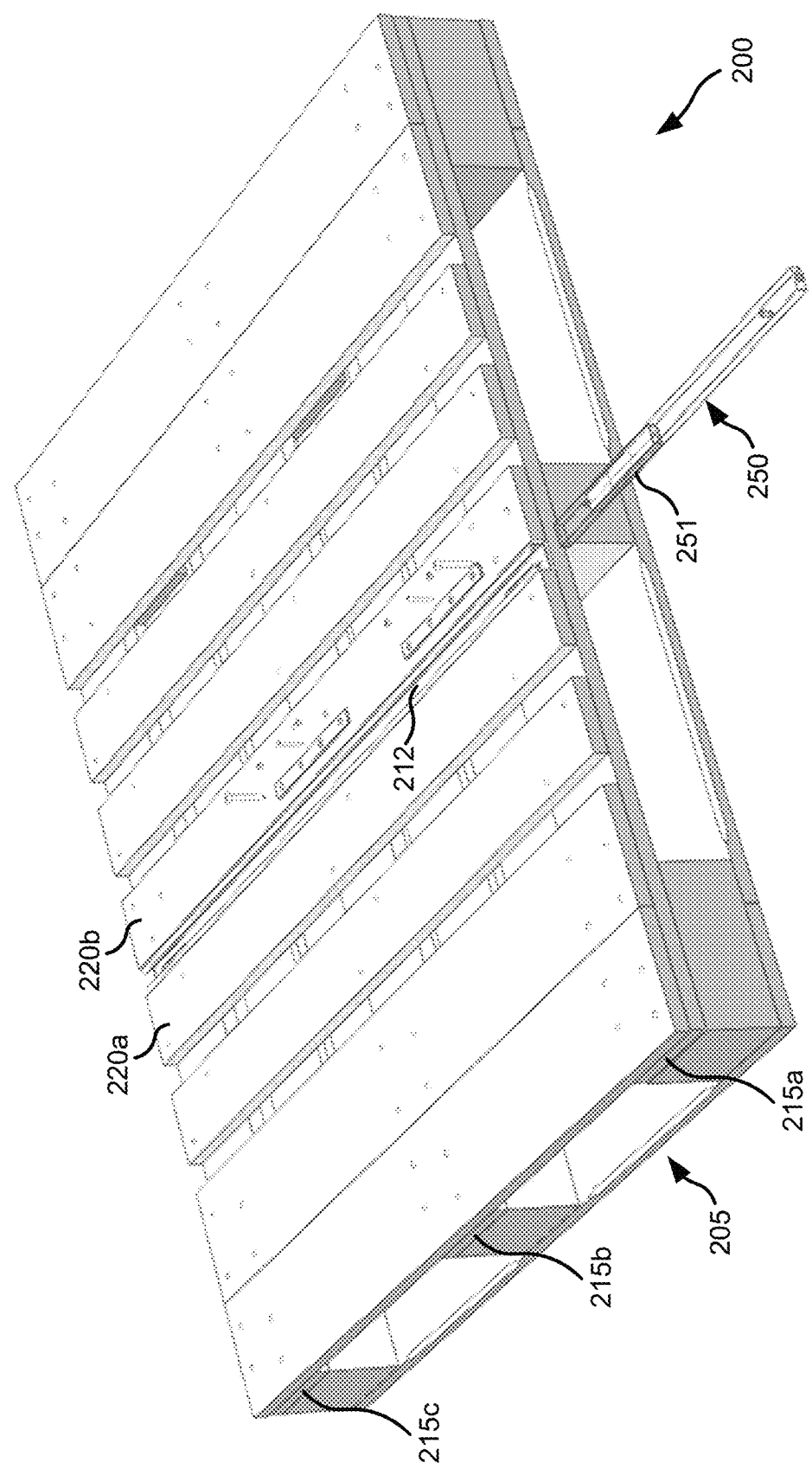
FIG. 10A shows a representation of a trackable transport structure, according to some embodiments of the present disclosure.
Figure 10B:
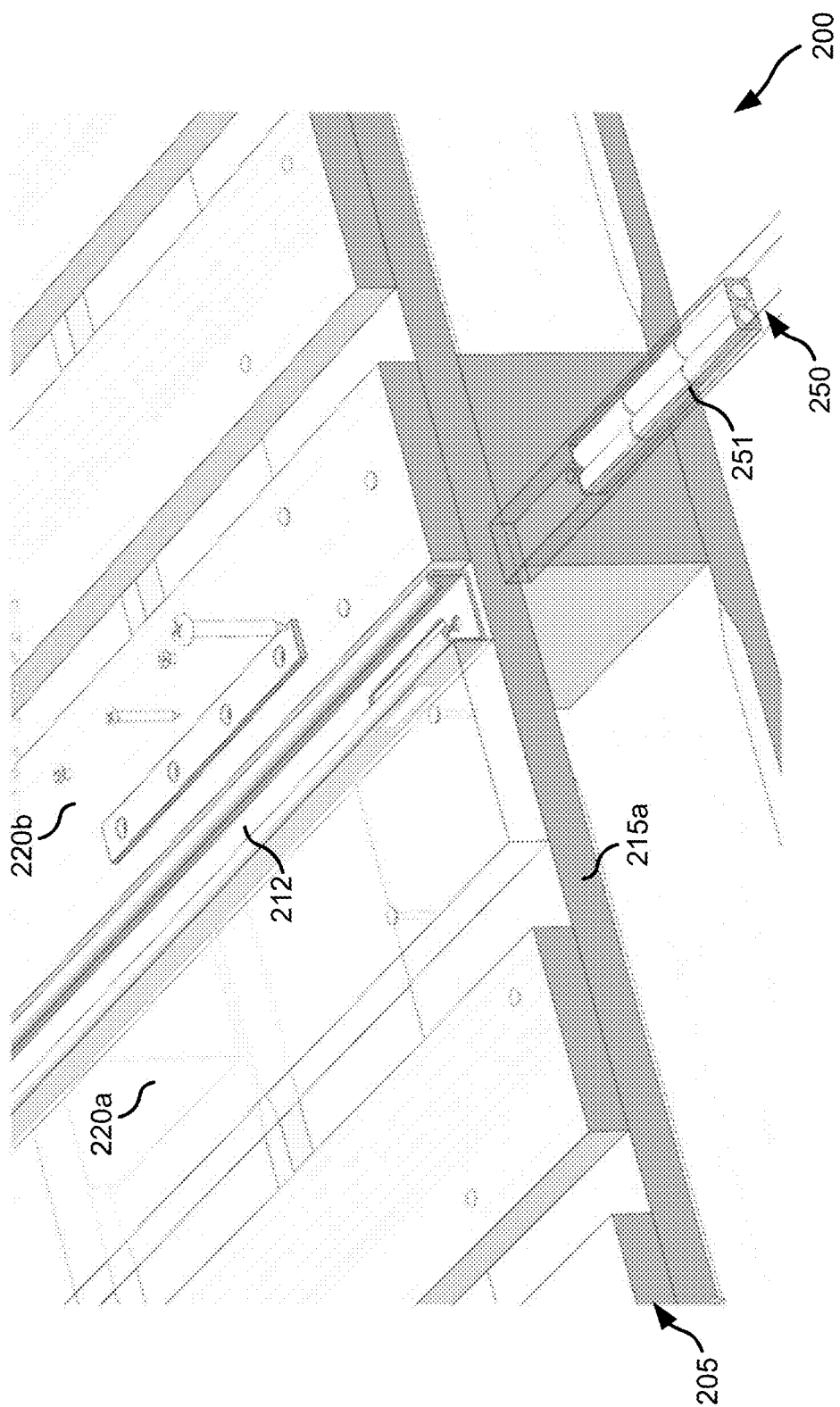
FIG. 10B shows a representation of a trackable transport structure, according to some embodiments of the present disclosure.

Referring now to FIGS. 10A and 10B, exploded, perspective views of trackable transport structure 200 are shown, according to some embodiments of the present disclosure. Tracking device 250 may include one or more batteries 251 that may be positioned within tracking device 250 such that they are aligned with a midpoint between lower longitudinal beams 215a and 215b or are aligned with a midpoint between lower longitudinal beams 215b and 215c such that batteries 251 are at a greater distance from the portions of pallet 205 where screws and/or nails may be inserted. In some embodiments in which a full-length strut 212 is utilized, tracking device 250 may include two separate portions with batteries 251 such that half of batteries 251 are positioned within tracking device 250 such that they are aligned with a midpoint between lower longitudinal beams 215a and 215b and the other half of batteries 251 are positioned within tracking device 250 such that they are aligned with a midpoint between lower longitudinal beams 215b and 215c.

The antenna of tracking device 250 may have one of several configurations. For example, in some embodiments, the antenna may be positioned along the top side of tracking device 250 and may face the upward vertical direction. In some embodiments, the antenna may be positioned along the bottom side of tracking device 250 and may face the downward vertical direction. In embodiments in which the antenna faces downward, one or more apertures may be provided along the bottom side of half-length strut 211 and full-length strut 212 such that the antenna is not impeded. In some embodiments, the antenna may be positioned along the lateral side of tracking device 250 and face the outward direction. For example, the antenna may face the direction of the opening of the strut through which tracking device 250 was inserted. In some embodiments, tracking device 250 includes multiple antennas using any combination of the above mentioned configurations.

Figure 11:
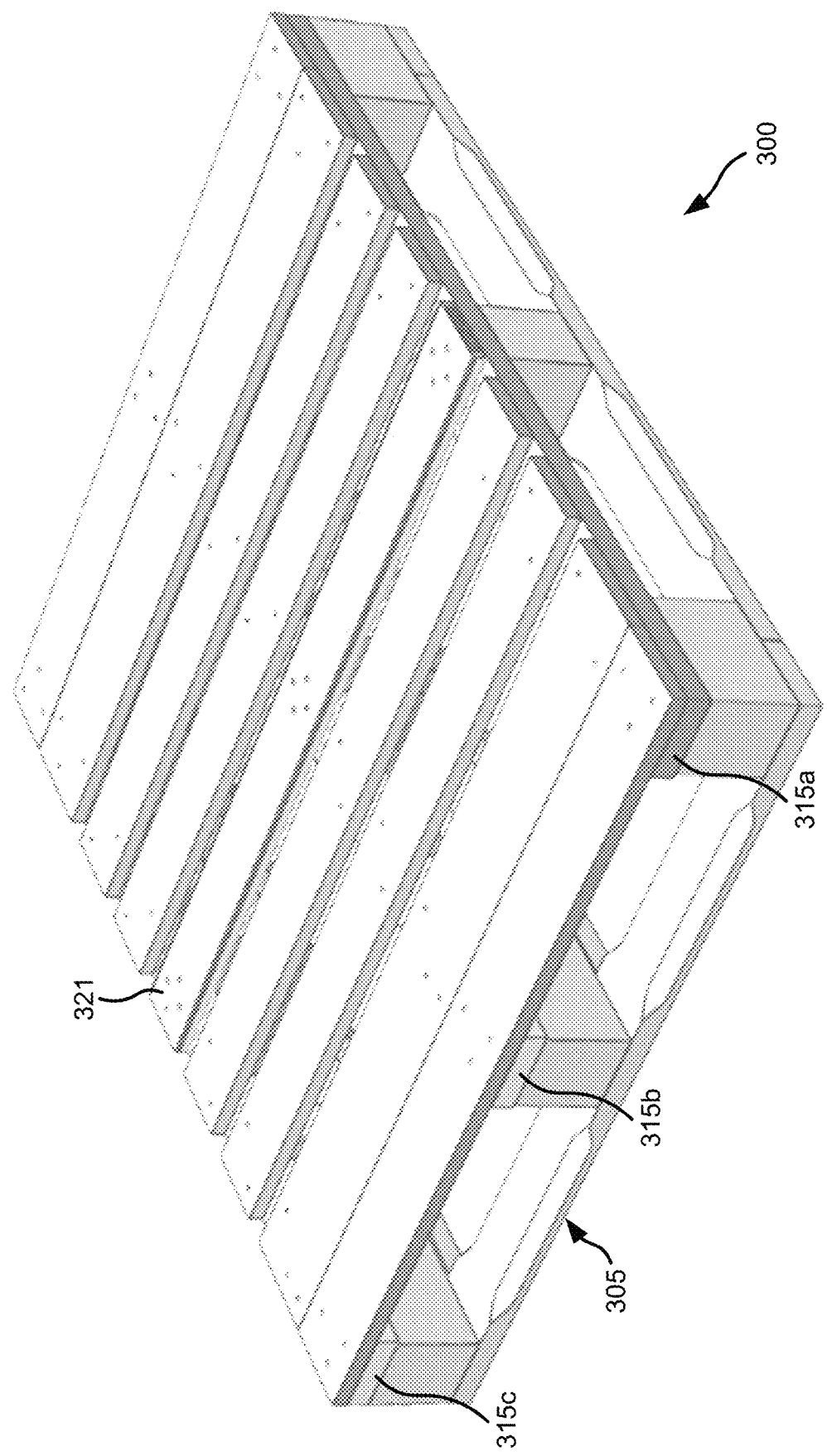
FIG. 11 shows a representation of a trackable transport structure, according to some embodiments of the present disclosure.

Referring now to FIG. 11, a perspective view of a trackable transport structure 300 is shown, according to some embodiments of the present disclosure. One or more properties of trackable transport structure 300 may be similar to those described in reference to trackable transport structures 100 and 200, and one or more properties of pallet 305 may be similar to those described in reference to pallets 105 and 205. Trackable transport structure 300 may include a tracker-enclosed beam 321 which may include an upper longitudinal beam 320 coupled to a casing 318 or may include a single integrated component. In some embodiments, trackable transport structure 300 may be coupled to the top side of lower longitudinal beams 315a, 315b, and 315c.

Although tracker-enclosed beam 321 is shown in FIG. 11 as an upper longitudinal beam, tracker-enclosed beam 321 may include any beam of pallet 305, including non-center beams and beams above or below the blocks of pallet 305. Considerations for determining which beam of pallet 305 to position tracker-enclosed beam 321 include antenna performance and risk of damage from potential forklift impacts.

Figure 12:
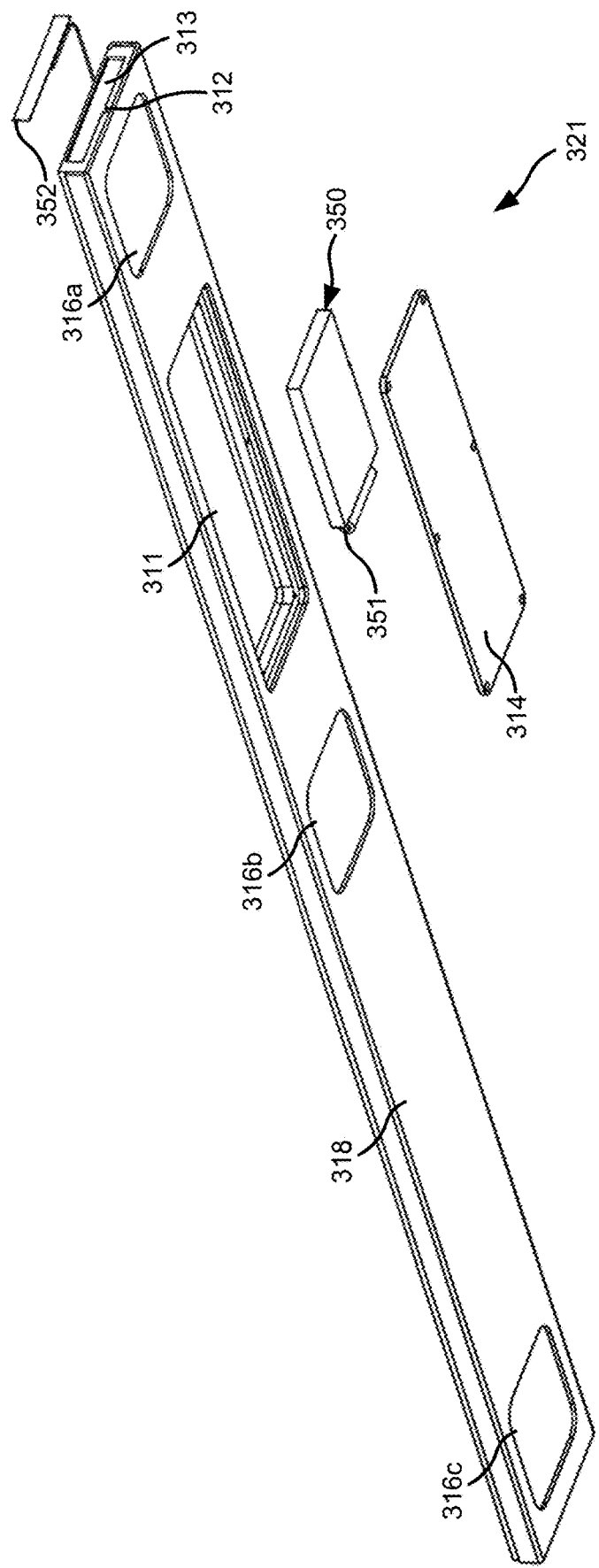
FIG. 12 shows a representation of a tracker-enclosed beam, according to some embodiments of the present disclosure.
Figure 13:
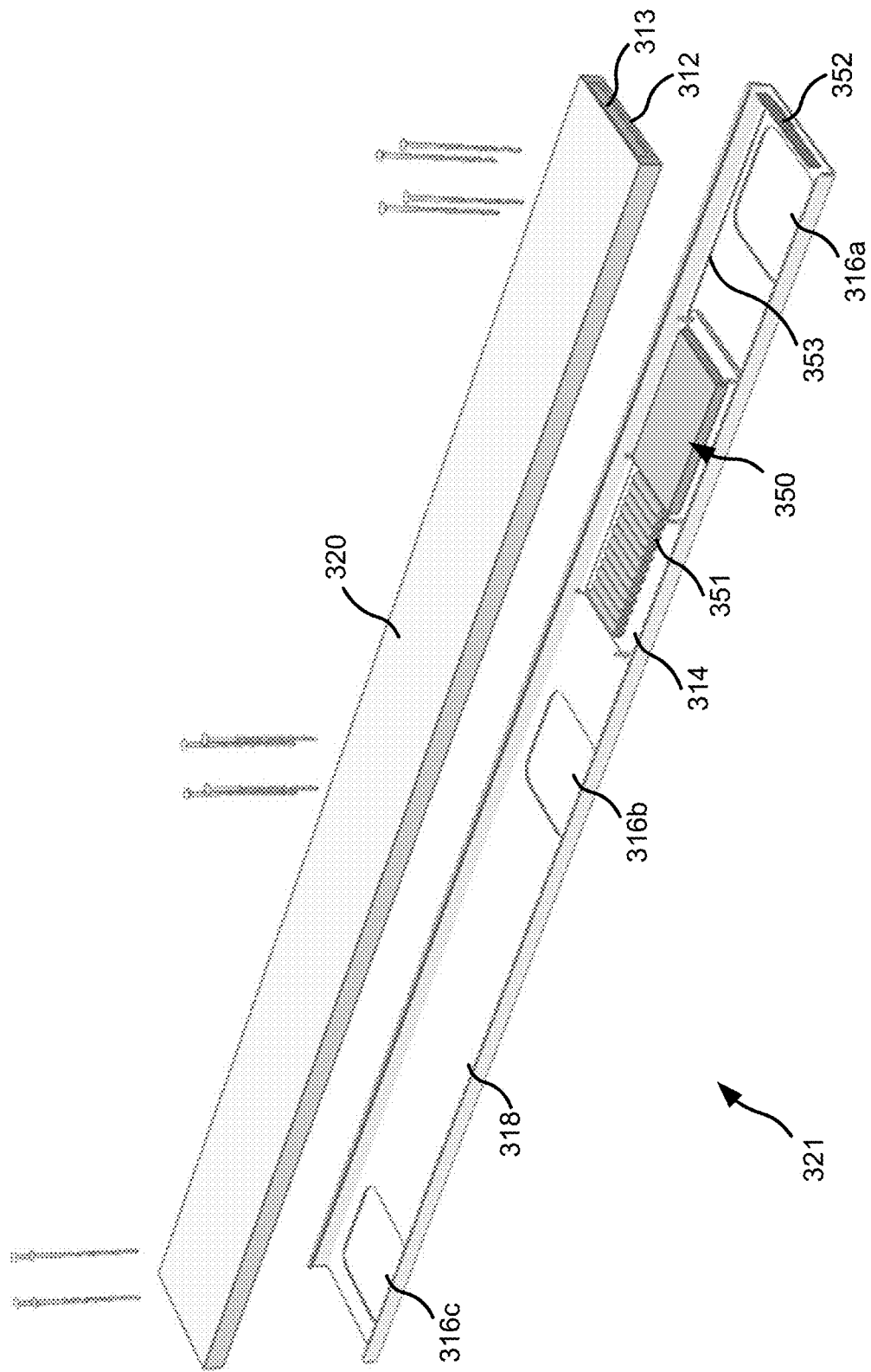
FIG. 13 shows a representation of a tracker-enclosed beam, according to some embodiments of the present disclosure.

Referring now to FIGS. 12 and 13, exploded, perspective views of tracker-enclosed beam 321 are shown, according to some embodiments of the present disclosure. Tracker-enclosed beam 321 may include a casing 318 for coupling to the bottom side of upper longitudinal beam 320. Casing 318 may include several apertures 316 for allowing screws or nails penetrating through upper longitudinal beam 320 to pass through casing 318. For example, in some embodiments, casing 318 is composed of metal and upper longitudinal beam 320 is composed of wood and therefore screws and nails may pass through both casing 318 and upper longitudinal beam 320 when inserted along apertures 316.

In some embodiments, tracker-enclosed beam 321 includes a device cavity 311 for enclosing tracking device 350. Device cavity 311 may include a cavity in both casing 318 and upper longitudinal beam 320 (as shown in FIG. 12), or a cavity in upper longitudinal beam 320 and an aligned aperture in casing 318. For example, in some embodiments, to accommodate an upward facing antenna it may be advantageous to include an aligned aperture in casing 318 to not impede the upward-facing antenna. Device cavity 311 may be positioned such that batteries 351 of tracking device 350 may be positioned near a midpoint between apertures 316a and 316b. In some embodiments, tracker-enclosed beam 321 includes a cover 314 for providing a flat surface along the bottom side of tracker-enclosed beam 321 and for protecting tracker device 350.

In some embodiments, tracker-enclosed beam 321 includes an antenna cavity 313 and a wire cavity 312 for accommodating a an antenna 352 and an antenna lead (e.g., antenna wire 353), respectively. Antenna cavity 313 may be placed on a lateral end of tracker-enclosed beam 321 such that the antenna faces an outward lateral direction. Wire cavity 312 may extend along the bottom side of (or internally within) tracker-enclosed beam 321 such that antenna 352 may be electrically coupled with other components of tracking device 350. In some instances, antenna cavity 313 is sized such that it is 1 mm to 10 mm in depth such that a relatively flat antenna (e.g., patch antenna) having a similar or smaller depth may be coupled to antenna cavity 313 and may receive less damage from glancing impacts to pallet 305.

In some embodiments, antenna wire 353 may be coupled to the inside surface of casing 318 such that it circumvents aperture 316a (as shown in FIG. 13). By circumventing aperture 316a, antenna wire 353 may be protected from screws and nails passing through aperture 316a.

In some embodiments, casing 318 may be attached to upper longitudinal beam 320 without modifying upper longitudinal beam 320 such that upper longitudinal beam 320 may be any one of various types of standard beams and boards. In other embodiments, upper longitudinal beam 320 is modified (e.g., hollowing, cutting) such that casing 318 may be attached more seamlessly and may, in some instances, allow tracker-enclosed beam 321 to appear as a standard beam or board. In some instances, casing 318 attaches to a standard beam or board in such a way as to increase, either slightly or significantly, the vertical depth/height of the beam.

What is claimed is:
1. A trackable transport structure comprising:
 a pallet including a plurality of blocks and a plurality of beams including a longitudinal beam, wherein the longitudinal beam includes a cavity accessible at a bottom side of the longitudinal beam;

a casing coupled to the bottom side of the longitudinal beam, the casing including a cavity region at least partially aligned with the cavity of the longitudinal beam;

a tracking device coupled to one or both of the cavity of the longitudinal beam and the cavity region of the casing, the tracking device comprising:

one or more electronic components disposed within the cavity; and an antenna coupled to the one or more electronic components.

2. The trackable transport structure of claim 1, wherein the tracking device is positioned within the cavity of the longitudinal beam.

3. The trackable transport structure of claim 1, wherein the tracking device is positioned within the cavity region of the casing.

4. The trackable transport structure of claim 1, wherein the pallet is formed of plastic.

5. The trackable transport structure of claim 1, wherein the pallet is formed of wood.

6. The trackable transport structure of claim 1, further comprising a protective material surrounding the tracking device.

7. The trackable transport structure of claim 1, further comprising a removable cover positioned over one or both of the cavity of the longitudinal beam and the cavity region of the casing.

8. The trackable transport structure of claim 1, wherein the longitudinal beam comprises a structural member of the pallet.

9. The trackable transport structure of claim 1, wherein the casing comprises one or more apertures with screws or nails passing through the one or more apertures into the longitudinal beam.

10. The trackable transport structure of claim 9, wherein the one or more apertures comprises a first aperture and a second aperture, and batteries for the tracking device are located in the casing at a midpoint between the first aperture and the second aperture.

* * * * *